United States Patent
Sandhalingam et al.

(10) Patent No.: US 11,014,790 B2
(45) Date of Patent: May 25, 2021

(54) SYSTEM AND METHOD FOR DETECTION AND WARNING OF WINCH ROPE NON-UNIFORMITY

(71) Applicant: Tulsa Winch, Inc., Tulsa, OK (US)

(72) Inventors: Sakthivel Sandhalingam, Bangalore (IN); Phaneendra Govindasetty Tirumani, Karnataka (IN); Haroon A. Khan, Tulsa, OK (US); Lonney James Brown, Jr., Owasso, OK (US); Amit Kumar, Karnataka (IN); Raveena D. Reddy, Karnataka (IN)

(73) Assignee: Tulsa Winch, Inc., Jenks, OK (US)

( * ) Notice: Subject to any disclaimer, the term of this patent is extended or adjusted under 35 U.S.C. 154(b) by 195 days.

(21) Appl. No.: 16/412,095

(22) Filed: May 14, 2019

(65) Prior Publication Data

US 2019/0367340 A1    Dec. 5, 2019

Related U.S. Application Data

(60) Provisional application No. 62/671,170, filed on May 14, 2018.

(51) Int. Cl.
| | | |
|---|---|---|
| *B66D 1/36* | (2006.01) | |
| *B66D 1/40* | (2006.01) | |
| *G01D 5/14* | (2006.01) | |

(52) U.S. Cl.
CPC .............. *B66D 1/36* (2013.01); *B66D 1/40* (2013.01); *G01D 5/145* (2013.01)

(58) Field of Classification Search
CPC . B66D 1/36; B66D 1/40; G01D 5/145; G01B 17/02; G01B 17/08
See application file for complete search history.

(56) References Cited

U.S. PATENT DOCUMENTS

| | | | | |
|---|---|---|---|---|
| 2,502,710 A | * | 4/1950 | McLean | B66D 1/56 |
| | | | | 254/271 |
| 2,754,382 A | * | 7/1956 | Francis | A01F 15/12 |
| | | | | 200/61.18 |
| 3,208,729 A | * | 9/1965 | Townsen | B66D 3/24 |
| | | | | 200/61.15 |
| 4,213,019 A | * | 7/1980 | Houp | E05D 13/00 |
| | | | | 200/47 |
| 4,448,394 A | * | 5/1984 | LeMoine | E21B 19/008 |
| | | | | 254/271 |
| 5,988,596 A | * | 11/1999 | Mitchell | B66D 1/36 |
| | | | | 254/271 |
| 7,309,059 B2 | * | 12/2007 | Marcil | B66D 1/56 |
| | | | | 254/271 |

(Continued)

FOREIGN PATENT DOCUMENTS

WO     2016138429 A1    9/2016

OTHER PUBLICATIONS

Honeywell, "SNDH-T Series Quadrature General Industrial Speed and Direction Sensors", 2009.

(Continued)

*Primary Examiner* — Emmanuel M Marcelo
(74) *Attorney, Agent, or Firm* — David G. Woodral; GableGotwals

(57) ABSTRACT

A plurality of sensors measure rope depth at a plurality of locations along an axis of a winch drum for use by a control unit in determining rope defects.

20 Claims, 18 Drawing Sheets

(56) References Cited

U.S. PATENT DOCUMENTS

| | | | | |
|---|---|---|---|---|
| 7,348,507 | B1* | 3/2008 | Mahnken | B66D 1/36 |
| | | | | 200/61.13 |
| 10,358,317 | B2* | 7/2019 | Laird | B65H 75/4484 |
| 10,723,602 | B2* | 7/2020 | Maghsoodi | B66D 1/36 |
| 2001/0020663 | A1* | 9/2001 | Petersen | B65H 63/00 |
| | | | | 242/485.7 |
| 2004/0094654 | A1 | 5/2004 | Gallagher et al. | |
| 2006/0192188 | A1* | 8/2006 | Sanders | B66D 1/54 |
| | | | | 254/361 |
| 2011/0315489 | A1* | 12/2011 | Nakamori | B66B 7/1215 |
| | | | | 187/391 |
| 2015/0198463 | A1 | 7/2015 | Weischedel | |

OTHER PUBLICATIONS

ISA/US, "International Search Report dated Aug. 2, 2019 in PCT/US2019/032258", Publisher: ISA/US.
Hans Turck GMBH & Co. KG, "Ultrasonic sensor diffuse mode sensor RU40U-M18E-LI8X2-H1151", Sep. 20, 2017.

* cited by examiner

SYSTEM AND METHOD FOR DETECTION AND WARNING OF WINCH ROPE NON-UNIFORMITY

CROSS-REFERENCE TO RELATED CASES

This application claims the benefit of U.S. provisional patent application Ser. No. 62/671,170, filed on May 14, 2018, and incorporates such provisional application by reference into this disclosure as if fully set out at this point.

FIELD OF THE INVENTION

This disclosure relates to winching devices in general and, more particularly, to winch rope management.

BACKGROUND OF THE INVENTION

Winch rope (often woven wire cable) is wound about a drum to effect lifting or pulling of the rope and/or load. The drum is normally rotated under power to wind the rope to provide lift or pulling force. The drum may be allowed to counter rotate in a controlled fashion to unwind the rope, thereby lowering the load or extending the rope from the drum.

Rope may be allowed to wind onto the drum in a free-form fashion. This may result in the rope winding onto the drum in a random or chaotic fashion. Rope may become concentrated in one area on the drum creating so called "bird's nests" or other undesirable states.

Steps can be taken to alleviate miswinding and other problems once they become known. However, the operator or control systems of the winching device may need to be made aware that a winding non-uniformity or error has occurred before the remedies can be deployed.

What is needed is a system and method for addressing the above, and related, issues.

SUMMARY OF THE INVENTION

The invention of the present disclosure, in one aspect thereof, comprises a system for monitoring for rope defects on a winch drum. The system includes a plurality of rope depth sensors configured to measure rope depth in a plurality of locations along an axis of the winch drum, a rotation sensor configured to measure at least complete rotations of the winch drum, and a control unit communicatively coupled to the rope depth sensors and the rotation sensor. The control unit provides an indication of rope non-uniformity when the winch drum has turned in a winding direction a sufficient number of turns for the rope to pass along the axis of the winch drum from one of the plurality of locations measured by one of the plurality of rope depth sensors to another one of the plurality of locations measured by another one of the plurality of rope depth sensors and the depth of rope on the winch drum is reported to be substantially unequal by the respective rope depth sensors.

In some embodiments, the control unit provides an indication of rope non-uniformity when the respective depth sensors report substantially equal depth of rope on the winch drum and the winch drum has not turned in the winding direction a sufficient number of turns for the rope to pass along the axis of the winch drum between the respective rope depth sensors. The control unit may provide an indication of insufficient wrap when at least one of the plurality of rope depth sensors indicates a rope depth less than a predetermined number of layers multiplied by a rope diameter.

In some cases, the plurality of rope depth sensors comprises a plurality of sonic sensors. The rotation sensor may comprise a Hall-effect sensor. The Hall-effect sensor may comprise a dual channel Hall-effect sensor with a quadrature output. The control unit may utilize the quadrature output to determine whether the winch drum is turning in the winding direction. In some cases, the control unit does not provide indication of rope non-uniformity when the winch drum is turning in a non-winding direction.

The invention of the present disclosure, in another aspect thereof, comprises a system for monitoring for rope defects on a winch drum. The system comprises a plurality of rope depth sensors configured to measure rope depth in a plurality of locations along an axis of the winch drum, a rotation sensor configured to measure at least complete rotations of the winch drum, and a control unit communicatively coupled to the rope depth sensors and the rotation sensor. The control unit provides an indication of rope non-uniformity when the winch drum has turned in a winding direction a sufficient number of turns for the rope to pass along the axis of the winch drum from one of the plurality of locations measured by one of the plurality of rope depth sensors to another one of the plurality of locations measured by another one of the plurality of rope depth sensors and the depth of rope on the winch drum is reported to be substantially unequal by the respective rope depth sensors. The control unit also provides the indication of rope non-uniformity when the respective depth sensors report substantially equal depth of rope on the winch drum and the winch drum has not turned in the winding direction a sufficient number of turns for the rope to pass along the axis of the winch drum between the respective rope depth sensors.

The plurality of sensors may be configured to measure rope depth along a plurality of segments along the axis of the winch drum. The rotation sensor may comprise a dual channel Hall-effect sensor with a quadrature output with the control unit utilizing the quadrature output to determine whether the winch drum is turning in the winding direction. In some cases, the indication of rope non-uniformity is not given when the drum rotates in an unwinding direction.

The indication of rope non-uniformity may comprise at least one of: a warning light; an audible alarm; and an output to an electronic communications bus. In some cases the control unit provides an indication of insufficient wrap when at least one of the plurality of rope depth sensors indicates a rope depth less than a predetermined number of layers multiplied by a rope diameter. The indication of insufficient wrap may comprise at least one of: a warning light; an audible alarm; and an output to an electronic communications bus.

In some embodiments, the plurality of rope depth sensors are arranged substantially equidistant from an axis of rotation of the winch drum along a mounting bracket spaced apart from the winch drum and parallel thereto. The plurality of rope depth sensors may comprise a plurality of sonic sensors.

The invention of the present disclosure, in another aspect thereof, comprises a system for monitoring for rope defects on a winch drum. The system includes first and second sonic sensors spaced apart from one another and from a rotational axis of the winch drum, the first and second sonic sensors being substantially the same distance from the rotational axis of the winch drum and each configured to measure a distance to the winch drum or rope layer on the winch drum at first and second respective locations along the rotational axis of the winch drum. The system also includes a Hall-effect sensor configured to measure at least complete rotations of the winch drum in a winding direction about its axis, and a control unit communicatively coupled to the sonic sensors and the Hall-effect sensor. The control unit provides a first indication of rope non-uniformity when the winch drum has turned in the winding direction a sufficient number of turns for a rope being wound onto the winch drum to pass from the first location to the second location but the first and second sensors do not report substantially the same distance. The control unit also provides a second indication of rope non-uniformity when the first and second sensors report substantially the same distance when the winch drum has not turned in the winding direction a sufficient number of turns for the rope being wound onto the winch drum to pass from the first location to the second location but the first and second sensors do not report substantially the same distance.

In some embodiments, the control unit provides an indication of insufficient rope wrap when the first and second sensors do not both report a distance less than the radius of the drum from its rotation axis plus a rope diameter multiplied by a predetermined number of required wraps.

The first and second indications of rope non-uniformity may utilize the same indicator. In some cases, neither the first nor second indication of rope non-uniformity are given if the Hall-effect sensor, via quadrature output to the controller, indicates the winch drum is rotating in an unwinding direction.

DETAILED DESCRIPTION OF THE PREFERRED EMBODIMENTS

Figure 13:
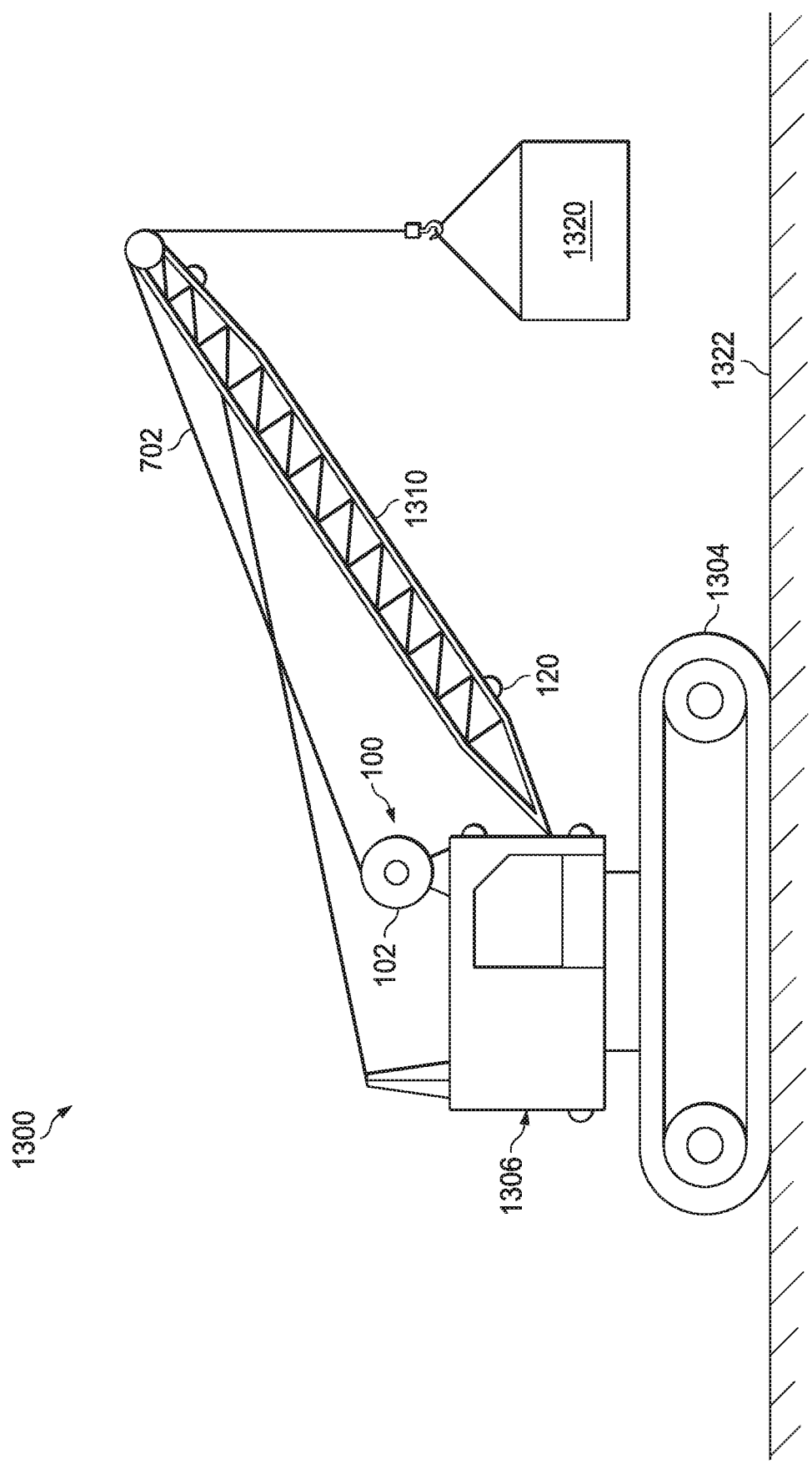
FIG. 13 is a high-level diagram of a crane employing a system for rope non-uniformity detection according to aspects of the present disclosure.

Referring first to FIG. 13 a high-level diagram of a crane 1300 employing a system for rope non-uniformity detection 100 according to aspects of the present disclosure is shown. The system for rope non-uniformity 100 (and other embodiments) are discussed in detail below. Here the system 100 forms part of a winch extending and retracting winch rope 702 (or cable) to move loads such as illustrated load 1320. The crane 1300 may have a tracked chassis 1304 for movement over ground surface 1322. A boom 1310 may be mounted to an articulating cab 1306. It should be understood that systems and methods of the present disclosure are not limited to any specific lifting or working machine but are suitable for any equipment using a winch for work or load movement.

Figure 14:
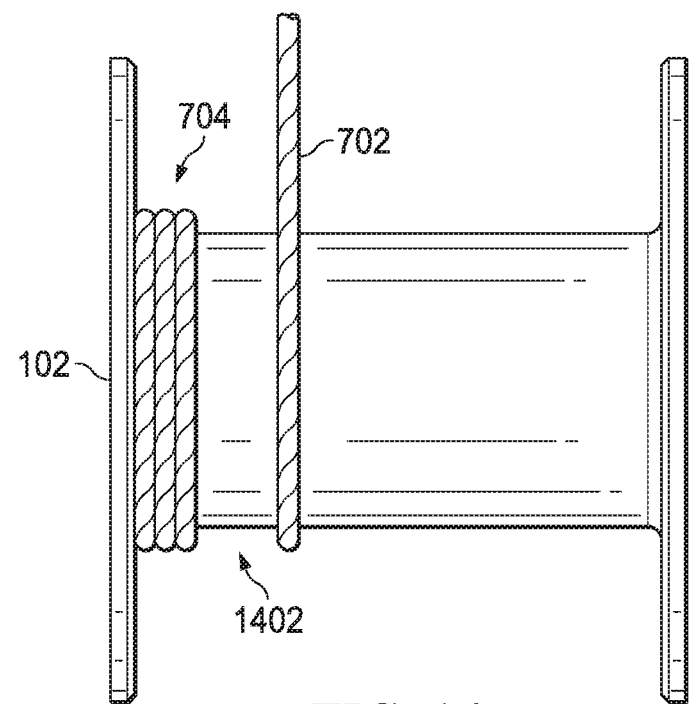
FIG. 14 is an overview of a winch spool in a condition of rope miss in the winding.

Various faults or defects may occur in winch winding. For example, FIG. 14 is an overview of a winch spool 102 in a condition of rope miss 1402 in the winding 704. Ideally, rope 702 should wind onto the spool or drum 102 in an orderly, side-by-side, and somewhat compact manner and until a layer is complete, at which location the rope 702 doubles back forming the second layer, wherein the rope should again be side by side and compact until the second layer and others are complete. In FIG. 14, the rope 702 has formed part of a layer of winding 704 but that then skipped a portion of the underlying spool 102 (this could also be the underlying rope layer) resulting in a miss condition at 1402.

Figure 15:
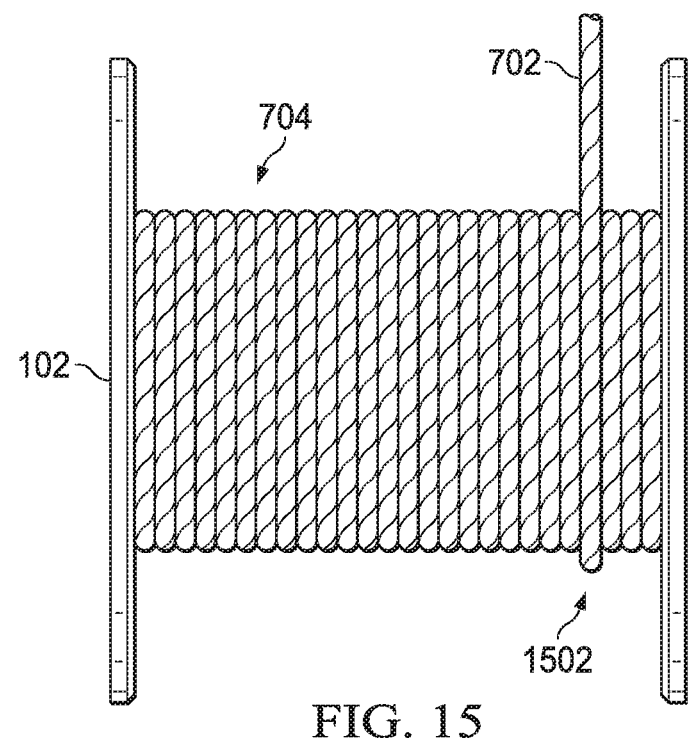
FIG. 15 is an overview of a winch spool in a condition of rope overlap in the winding.

Another fault condition is shown in FIG. 15, which is an overview of a winch spool 102 in a condition of rope overlap 1502 in the winding 704. Here rather than the rope 702 missing a portion of the spool 102 or underlying layer, it has overlapped before reaching the end of the spool 102. Both rope miss and rope overlap can be detected and reported by systems and methods of the present disclosure.

Figure 1:
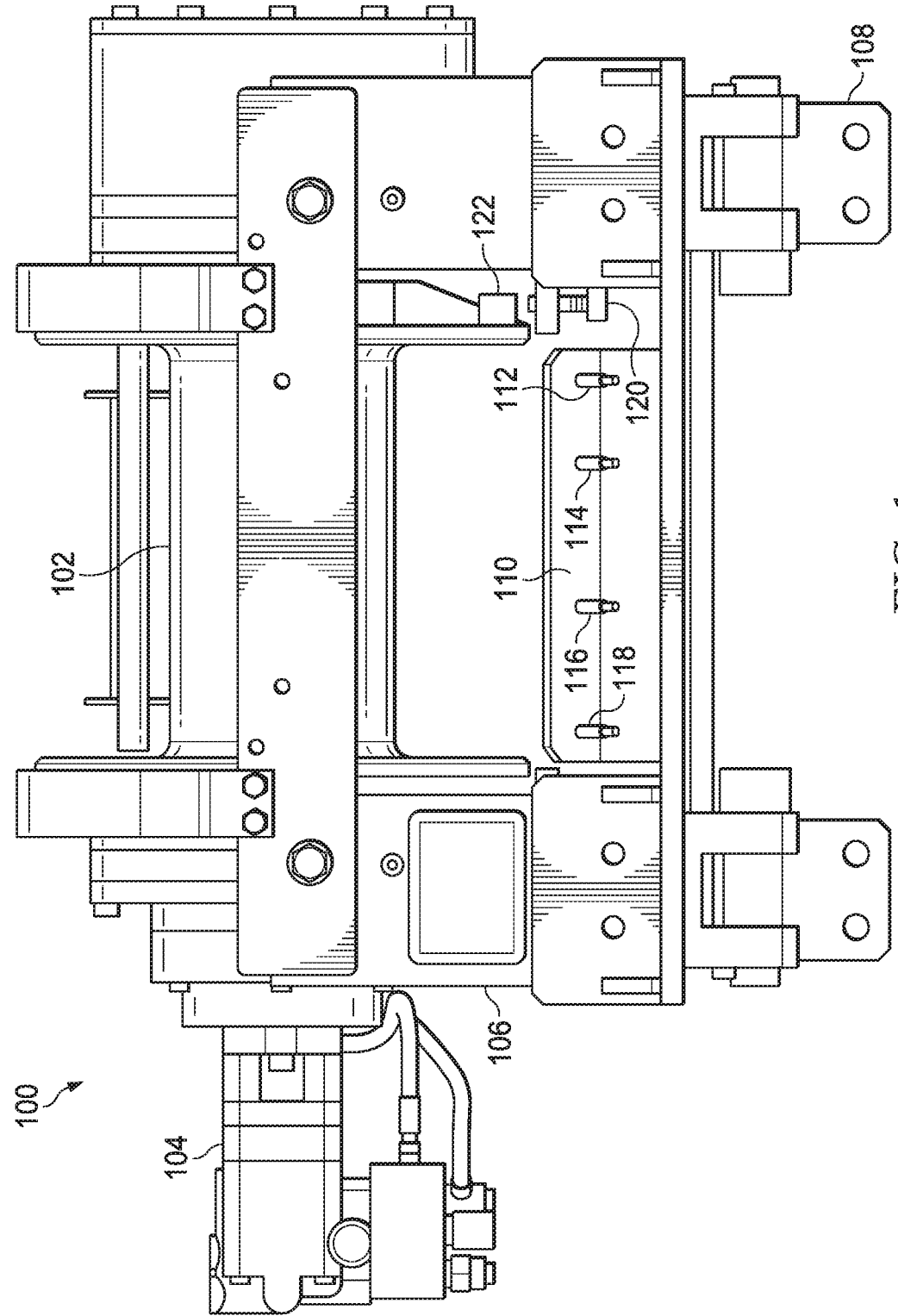
FIG. 1 is a system view of a system for rope non-uniformity detection according to aspects of the present disclosure.

FIG. 1 is frontal view of a winch 100 having a system for rope non-uniformity detection according to aspects of the present disclosure. The systems and methods of the present disclosure may operate on existing winch drums (e.g., via retrofit), or be installed with new winch systems at the time of manufacture. A spool or drum 102 is provided as part of the winch 100 for reeling cable or rope (not shown in this view) in and out for pulling or lifting loads. The winch 100 may be electricity or hydraulically powered, or powered by other sources. A hydraulic motor 104 is shown here. A gearing and braking system (internal, not shown) may also be provided as known in the art. The winch 100 may be placed on a crane or other lifting or pulling device (see, e.g., FIG. 13). The winch 100 may be mounted to brackets 108 associated with a machine cab, chassis, or other secure mounting location. Winches employing systems and methods of the present disclosure are not limited to placement or operation on particular machines (unless so claimed).

A sensor bar 110 or other mounting mechanism may locate a plurality of sensors distance sensor 112, 114, 116, 118 arranged laterally with respect to the winch drum 102. The sensors 112, 114, 116, 118 may be arranged so as to each be substantially of equal distance above the surface of the winch drum 102 from which rope or winch line is spooled. For purposes of the present embodiment, substantially equi-distant shall be taken to mean the same distance from the drum surface plus or minus less than 25% of the thickness of winch rope utilized. Thus, any two sensors would vary in their distance from the drum surface by less than 50% of the rope thickness, and therefore report the same rope depth or coil count for the same rope depth.

The sensors 112, 114, 116, 118 detect a distance to the surface of any object on the winch drum (typically, the rope surface). Thus they may also be thought of as rope depth sensors and capable of determining (at least indirectly or based on calculations) the depth of the rope wrap from an axis of rotation of the drum 102 or from the outer surface of the drum 102 onto which rope winds. Optical, laser, sonic, or other sensors may be used. In the present embodiment, ultrasonic sensors are used capture the objects in a contactless and wear-free process using ultrasonic waves. It would not matter whether the object ranged is transparent or opaque, metallic, non-metallic, firm, liquid or powdery, etc. Environmental conditions such as spray, dust or rain have minimal effect on the functioning of ultrasonic sensors. The ultrasonic position sensors are used to measure the distance from drum (rope surface) to the sensor position. The sensors 112, 114, 116, 118, being placed a fixed distance from the drum 102 (e.g., substantially the same distance), accurately report rope depth wound onto the drum 102. In one embodiment, the sensors 112, 114, 116, 118 are ultrasonic sensors providing an analog electrical output signal (e.g., 4-20 mA or a voltage) with respect to the distance sensed. In one embodiment, the sensors deployed are part number available as part number UB500-18GM75-I-V15 from Pepperl & Fuchs Factory Automation Pvt. Ltd.

Figure 3:
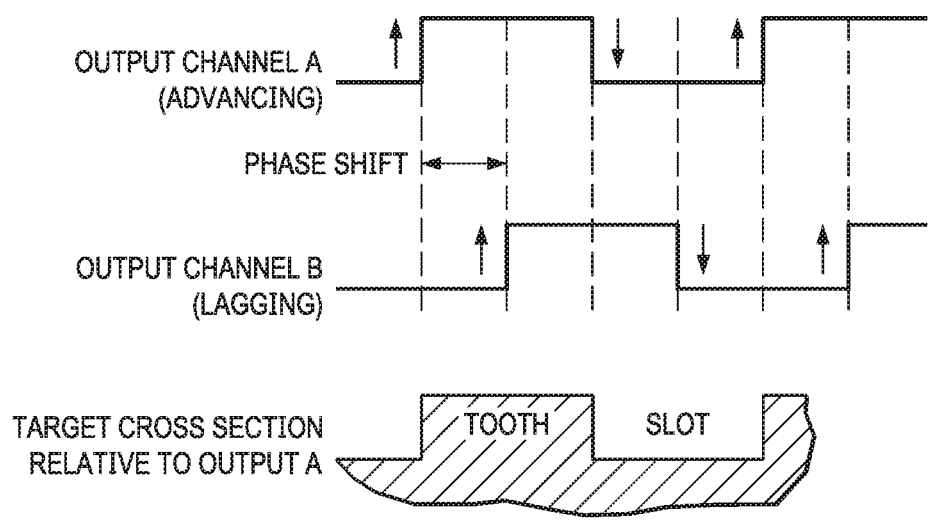
FIG. 3 is a view of a voltage diagram cross referenced to a tooth sensed by a Hall-effect sensor as part of the system of FIG. 1.

According to various embodiments, rotation or partial rotation, and direction thereof, of the drum 102 may be measured. Various rotation sensors may be used, including those based on inductive or capacitive effects. Such sensors may be encoder based in order to provide direction of rotation without need for multiple sensors. According to some embodiments, such a rotation sensor that is capable of providing both rotation or partial rotation count, and rotation direction, comprises one or more Hall-effect sensors that report signals based on the periodic passage of one or more teeth 122 affixed to the winch drum 102 so as to pass in close proximity to the one or more Hall-effect sensors as the drum 102 rotates. In the illustrated embodiment, a single Hall-effect sensor 120 is employed. The Hall-effect sensor 120 may comprise a differential Hall-effect sensor for directly determining drum rotation. In one embodiment, the Hall-effect sensor 120 is a sensor available under part number SNDH-T from Honeywell International. In another embodiment, a Hall-effect sensor available under part number MFM7-HS1Q-5KCD4 available from sensorso.com may be used. In the present embodiment, two teeth 122 are attached to the drum and may be sensed by the Hall-effect sensor 120. Teeth that are useful as Hall-effect sensor targets include various devices such as a magnetic target available under part number PM-SCS50S-01022S from sensorso.com. In various embodiments, more or fewer teeth 122 and or sensors 120 may be used. In the present embodiment, the sensor 120 provides the number of revolutions of the drum 102 along with rotation direction information using a quadrature output with signals 90 phase shifted from each other as shown in FIG. 3.

The ultrasonic sensors 112, 114, 116, 118 and the Hall-effect sensor 120 may be communicatively coupled to an electronic control unit 106. The electronic control unit 106 may be based on a microprocessor or microcontroller and other integrated circuitry. The electronic control unit 106 may operate the sensors and detect and report data therefrom. In some embodiments, the control unit 106 also illuminates warning lights or alarms when faults are detected.

In principle, the operation of various embodiments of the present disclosure relies upon the detectors or sensors 112, 114, 116, 118 determining a depth or distance from their fixed location (e.g., sensor bar 110) to the winch drum 102, or to the rope winding onto the drum 102. The signals from the sensors 112, 114, 116, 118 along with signals from the Hall-effect sensor 120 can be used to determine non-uniformity of the rope winding onto the drum and minimum rope wrap identification, as explained in greater detailer below.

Figure 2:
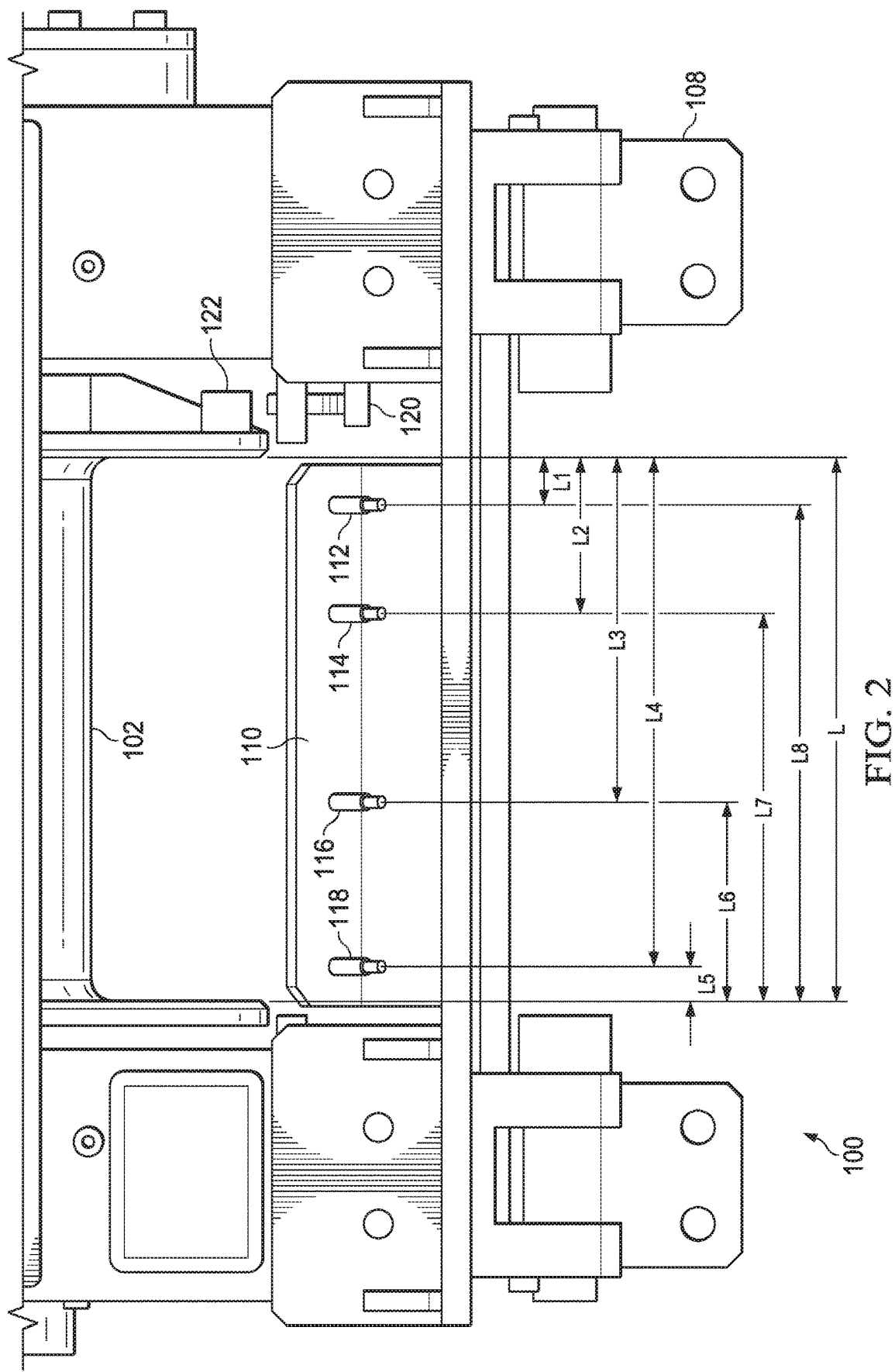
FIG. 2 is a close-up view of a portion of the system of FIG. 1.

FIG. 2 is a close-up view of a portion of the system of FIG. 1. In the embodiment shown, four sensors 112, 114, 116, 118 are used and are placed at known distances along the length of the drum 102 (e.g., along the bar 110). These distances may be defined as L1, L2, L3, . . . L8 based upon the location of the four sensors as shown. As can be seen from FIG. 2, L1 corresponds to the distance along the drum from the far-right end of the drum 102 to the lateral location of the sensor 112. L2, L3, and L4 correspond to the distance from the same end of the drum 102 laterally to sensors 114, 116, 118, respectively. L5 can be seen to correspond to the distance from the far-left end of the drum 102 laterally to sensor 118. L6, L7, and L8 correspond to the distance from the same end of the drum 102 laterally to sensors 116, 114, 112, respectively. Here, the entire length (axially) of usable portion of the drum 102 may be defined as L, as shown. More or fewer distances may be utilized in various calculations in embodiments where a number of sensors other than four are deployed.

In various embodiments, the electronic unit 106 may be provided with a rope diameter (Dr) corresponding to rope to be utilized with an associated winch drum (e.g., winch drum 102). This data may be received via data manual entry or selection, or via external user configuration information through standard communication protocol like UART or CAN.

Knowing the rope diameter, Dr, a number of revolutions, Rx, of the drum 102 needed for the rope to reach any sensor's lateral location from the start of winding (from the right for L1-L4, from the left for L5-L8) may be calculated as shown below:

R1=L1/Dr
R2=L2/Dr
R3=L3/Dr
. . .
R8=L8/Dr

The number of revolution needed for one complete layer (Rc) may be calculated as follows: Rc=L/Dr. Actual drum revolution (Ra) may be counted using Hall-effect sensor outputs from sensor 120. The direction of rotation of the drum 102 may be identified using phase shift between two outputs of the Hall-effect sensor 120 as shown in FIG. 3. Revolution count values may be adjusted based on direction of the drum rotation. The electronic control unit 106 may perform all necessary calculations.

If the Ra is greater than calculated revolution (R1-R8), the corresponding ultrasonic sensor output is measured. If the ultrasonic sensor output distance is reduced by the distance (rope diameter (Dr)*Number of layer (Nc)), there is no rope non-uniformity in windings up to that particular the ultrasonic sensor point. If the measured ultrasonic sensor distance has not been reproduced appropriately, a rope non-uniformity exists, and the user (or downstream system) should be warned.

To restate the forgoing positively, as the rope winds onto the drum 102, if it does so normally, or in an orderly fashion, the distance detected by any ultrasonic sensor (e.g., 112, 114, 116, 118) should decrease by one rope diameter (Dr) as the rope passes under. Then the next ultrasonic sensor should detect a decrease, and so on, until the sensor order reverses as the rope begins winding back. Any departure from this systematic detection of decreasing distance indicates the rope has not wound in an orderly fashion and a non-uniformity should be reported.

During unwinding, the above methodology may not be applied since defects are not usually generated during unwinding. Additionally, the unwinding may occur in order to attempt to correct a defect previously identified. In some cases, the rotation of the drum (Ra) may be tracked by the control unit 106 even in unwinding, so that the same can be available for use as soon as winding (e.g., lifting or pulling) begins again.

Figure 7:
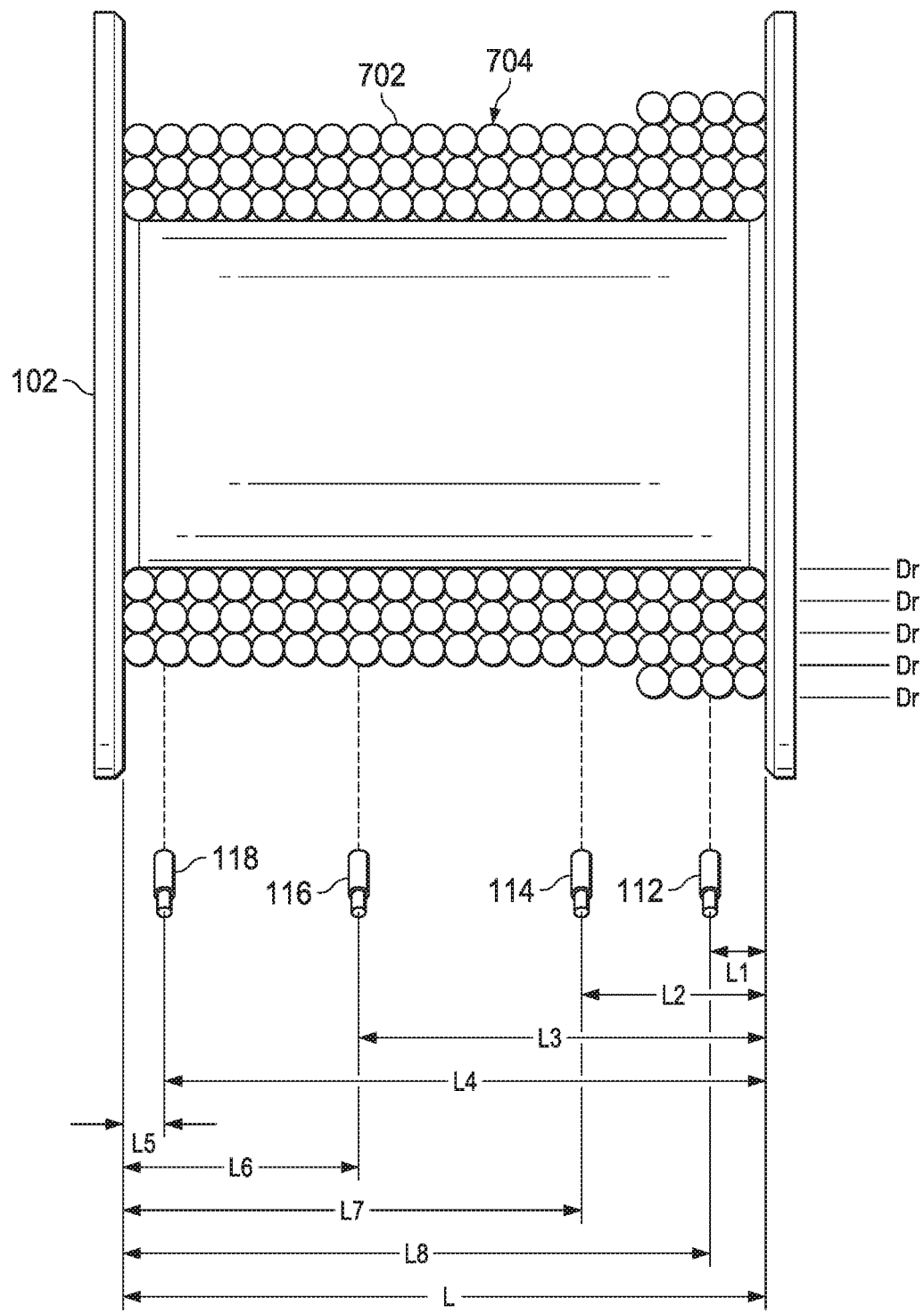
FIG. 7 is a side cutaway view of a winch spool with rope arranged into a winding configuration.

Referring now to FIG. 7, a side cutaway view of a winch spool 102 with rope 702 arranged into winding 704 is shown. Here, positioning of the acoustic sensors 112, 114, 116, 118 is also shown near the spool 102 and over the rope 702. The rope 702 can be seen to be of diameter Dr. Everywhere on the spool 102 the total depth of the winding 704 is approximately 3*Dr since three complete layers are completed. Only three revolutions of a fourth layer or winding have occurred and this fourth layer of winding is not complete, but stops between sensors 112 and 114. Readings from the acoustic sensors 112, 114, 116, 118 and from the Hall-effect sensor 120 can indicate to the electronic control unit, based on the relationships described above that the winding 704 is fully three layers deep, that three additional revolutions of spool 120 have occurred since then. Prediction can then be made by the control unit 106 when (in terms of spool revolution) the fourth layer of rope 702 should be detected in place by sensor 114. A departure of the uniform depth or failure of rope 702 to be detected when expected indicates a rope winding defect.

Figure 4:
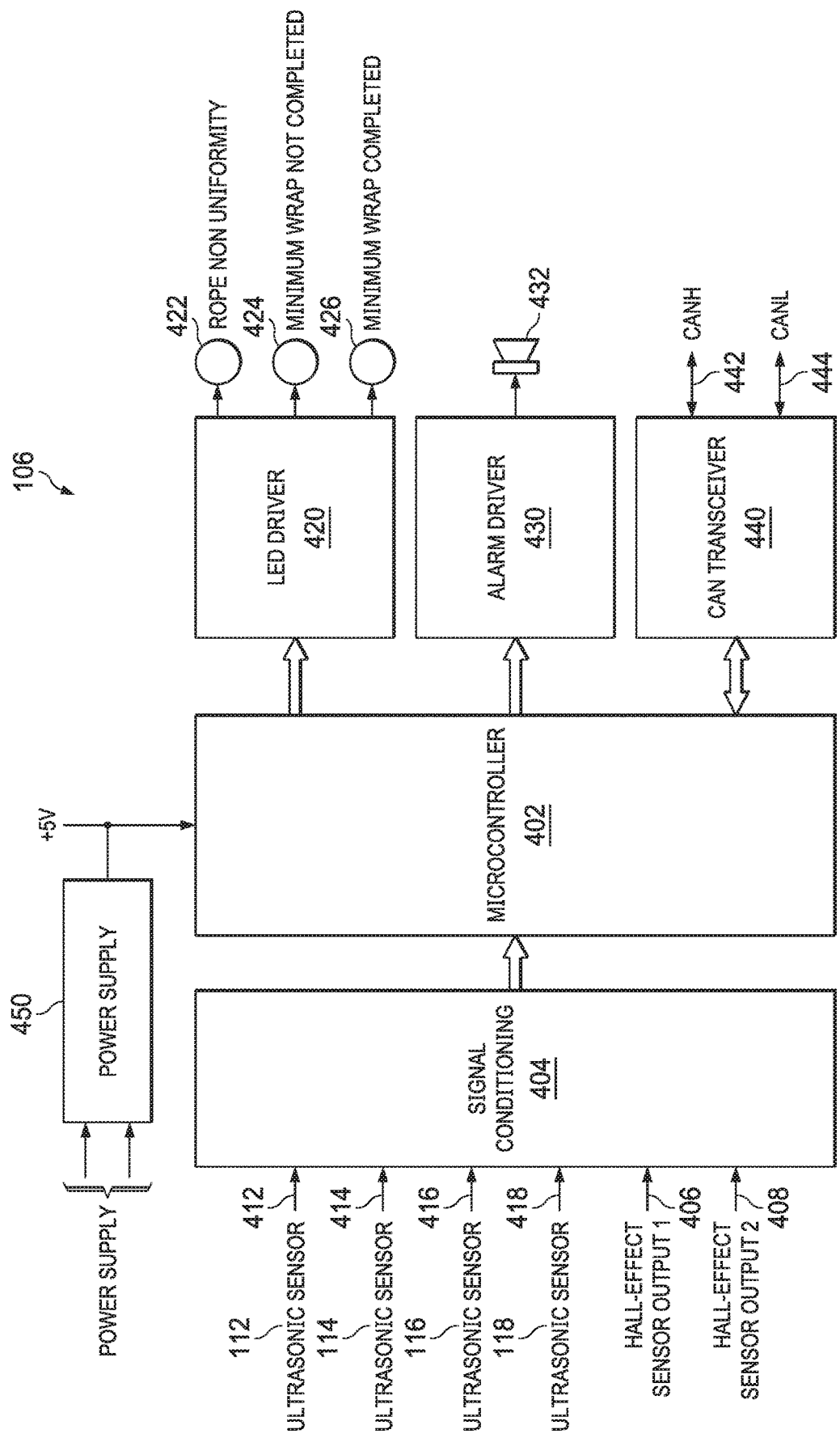
FIG. 4 is a high-level electronic block diagram of a system for rope non-uniformity detection according to aspects of the present disclosure.

A block diagram for one embodiment of the electronic unit 106 is shown in FIG. 4. It should be understood that a microcontroller 402 could be a process or processes running on a general-purpose computer, or the microcontroller 402 could be emulated. The microcontroller 402 could also be a single-purpose device or an application specific integrated circuit (ASIC). The microcontroller 402 implements logic, calculation, and control routines necessary to obtain input data from the sensors, perform calculations with respect to rope defects as discussed herein, and control output warning devices or signals. The microcontroller may be hard-coded or hard-wired to implement the necessary functions, or may be programmed using assembly or a higher-level language as is known in the art.

In the present embodiment, a signal conditioning block 404 may be used that accepts raw input of voltages from the various sensors and amplifies and/or conditions these signals accordingly for use by the microcontroller 402. In some embodiments, the signal conditioning block 404 may be on the same logic board, or even the same chip, as the microcontroller 402. In some instances, such as where a system-on-a-chip device is deployed as the microcontroller 402, the signal conditioning block 404 may be fully integrated with the microcontroller 402. Here the signal conditioning block 404 may have an input 406 corresponding to a first out from the Hall-effect sensor 120 (e.g., channel A) and an input 408 corresponding to a second output from the Hall-effect sensor 120 (e.g., channel B). The signal conditioning block 404 may have inputs 412, 414, 416, 418 corresponding to the sonic sensors 112, 114, 116, 118, respectively. The conditioned signals may be passed to microcontroller 402 via an internal bus or via memory or cache locations where the signal conditioning block 404 is fully integrated with the microcontroller 402.

There may be one or more ways for the electronic control unit 106 to signal an error condition with respect to rope winding. For example, as shown, an LED (light emitting diode) driver 420 may be configured to drive a number of LEDs or other visual indicators corresponding to various conditions associated with the rope. A rope non-uniformity LED 422 may comprise a red LED to signal a non-uniformity or other defect condition. A minimum wrap not completed LED 424 may comprise, for example, an amber LED to indicate that no defects have occurred, but that the spool 102 must be wound further before a minimum number of rope wraps have been completed to enable safe use of the winch, crane, or other device utilizing the spool 102. The electronic control unit 106 may provide, for example, a green LED 426 to indicate minimum wraps are completed and the spook 102 can be loaded or used for work.

It should be understood that the LED driver 420 may comprise the necessary current drivers, amplifiers, relays, resistors, and other components known in the art to enable the microcontroller 402 to illuminate the respective LEDs 422, 424, 426 to signal the various conditions described, or others. In some embodiments, the LED driver 420 may be fully integrated with the microcontroller 402, particularly where low-current or low-voltage LEDs are utilized.

In addition to visual outputs, an audible alarm 432 may be provided by the electronic control unit 106. To that end an alarm driver 430 may be provided to establish sufficient current to drive a voice coil speaker, a piezo-electric buzzer, or another audible device. Here again, if the alarm 432 draws sufficiently low current and voltage, it may be powered directly by the chip or device comprising the microcontroller 402.

A CAN (controller area network) bus transceiver 440 is shown in FIG. 4 for purposes of "broadcasting" the state of the rope winding to other systems. Here the CAN transceiver 440 is shown providing the CANH input/output 442 and CANL input/output 444 as are known in the art. This interface also allows the microcontroller 402 to receive data as well (e.g., Dr or other parameters or control signals that may be needed). It should be understood that other embodiments may employ additional or different communication protocols from CAN. For example, serial, Bluetooth or Wi-Fi control and communication may be implemented.

A power supply 450 may be provided for accepting available input voltage (e.g., 12 VDC, or 110 VAC) and converting the same to a usable voltage by components associated with the electronic control unit 106. It should be understood that, where needed, the power supply 450 may be connected to other components illustrated in FIG. 4 (e.g., alarm diver 430 or LED driver 420).

Figure 5:
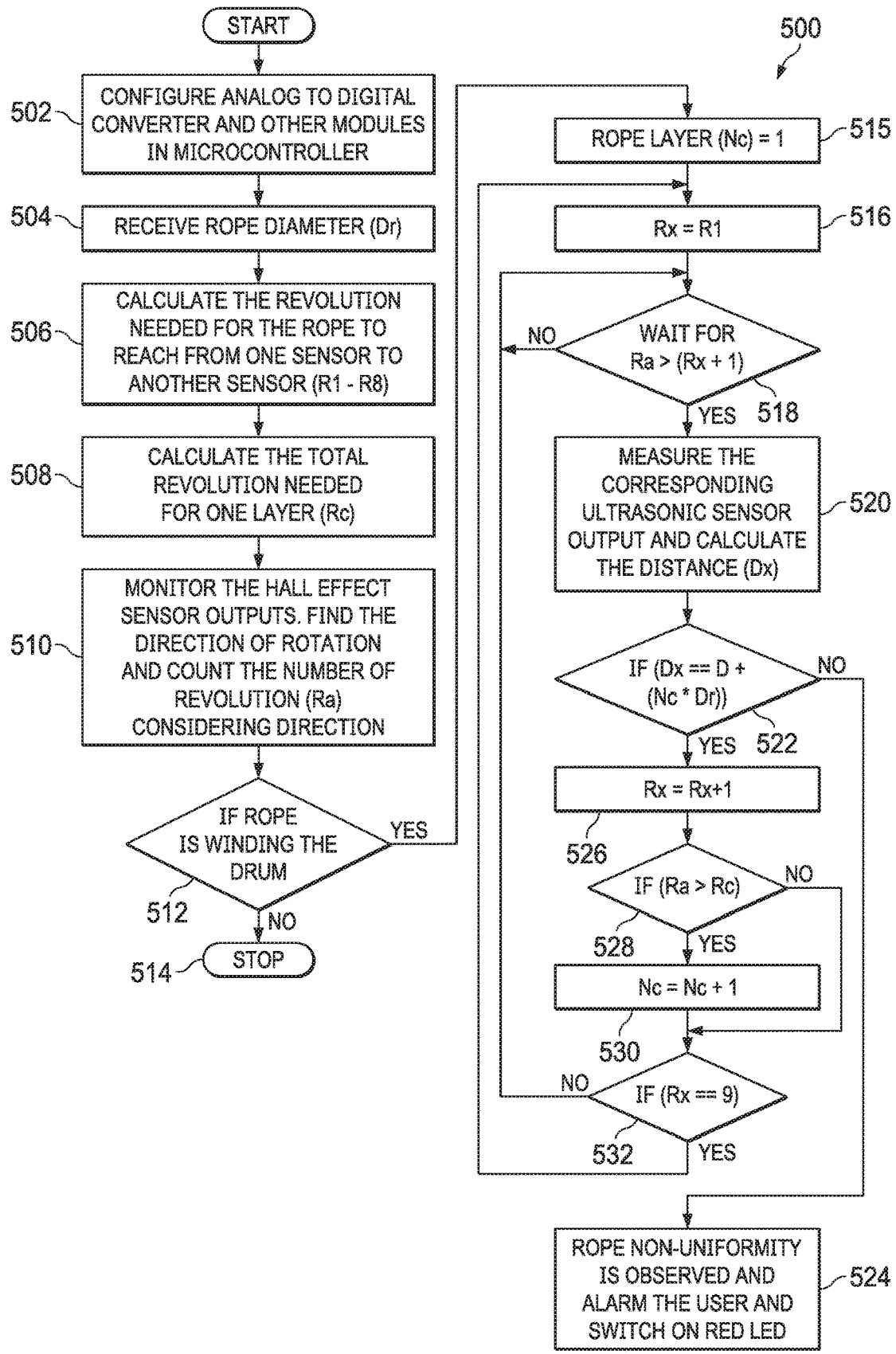
FIG. 5 is a flow diagram of a method of detecting rope non-uniformities using a system of the present disclosure.

Referring now to FIG. 5, a flow chart 500 corresponding to potential firmware or programming logic to be executed, for example, by the microprocessor 402 is shown. The flow chart 500 corresponds for an operation to be performed during rope winding to detect non-uniformities of the winding by systems and methods of the present disclosure.

From the start, at step 502 any necessary parameters and modules may be initialized. At step 504 rope diameter, Dr, is received via CAN bus or other input. Given Dr, the microcontroller 402 calculates and stores values corresponding to L1-L8 at step 506. At step 508 revolutions for one complete layer, Rc, is computed. These calculation steps can occur very quickly given the speed of even low power silicon chips.

At step 510 the Hall-effect sensor 120 is monitored to determine when rope winding starts or is otherwise occurring. Number of revolutions, Ra, may therefore be observed/determined. At step 512 if no winding is occurring the illustrated subroutine may stop at step 514. In other embodiments a wait cycle may occur. If rope is determined to be winding onto the drum (spool) the rope layer, Nc, may be set to 1 at step 515. The rope count to next sensor, Rx, may be set to the computed value for R1 at step 516. A wait cycle occurs at step 518 until actual rotations (based, e.g., on the Hall-effect sensor 120 output), Ra, is greater than Rx+1. This indicates that the next ultrasonic sensor in the progression for the current layer should have been reached.

At step 520 the output of the corresponding ultrasonic sensor may be measured or polled by the microcontroller 402. A distance Dx, corresponding to the distance the sensor should record for the current rope layer (e.g., distance to spool or drum minus current layer*rope diameter) is calculated and stored. At step 522 if the calculated distance Dx is not equal to the measured distance D plus the rope layer times the diameter a rope non-uniformity is reported at step 524. Note that a uniformity may be reported if a portion of a layer has been skipped or if the rope has doubled up on the winding layer before reaching the end of the spool 102 or drum. In either case the calculated and measured distances would disagree. It should be understood that some minor differences in measured and computed values could be ignored. For example, a 5% variance is not likely to be indicative of a winding defect. In some embodiments, the variance is allowed to be up to 1%, up to 5%, up to 10%, up to 15%, up to 20%, up to 25%, up to 30%, up to 40%, or up to 50%.

If the computed value Dx agrees within an acceptable variance with the measured value D plus rope layer, Nc, times rope diameter, Dc, at step 526 Rx may be incremented by 1. At step 528 it may be determined if actual rotations Ra are greater than rotations needed for the layer Rc then Nc is incremented by 1. If Ra is not greater than Rc a determination is made at step 532 if Rx is equal to 9. This would indicate completion of the progression through the sonic sensor positions, in which case Rx may be reset to 1 by returning to step 516. If Rx is not equal to 9, control returns to a waiting cycle for Ra>(Rx+1) at step 518.

It should be understood that a programmer or developer of skill in the art may conceived numerous additional logical ways to implement systems and methods of the present disclosure. Thus, flow chart 500 illustrates one example of an efficient program flow for implementing a system and/or method according to the present disclosure.

Figure 6:
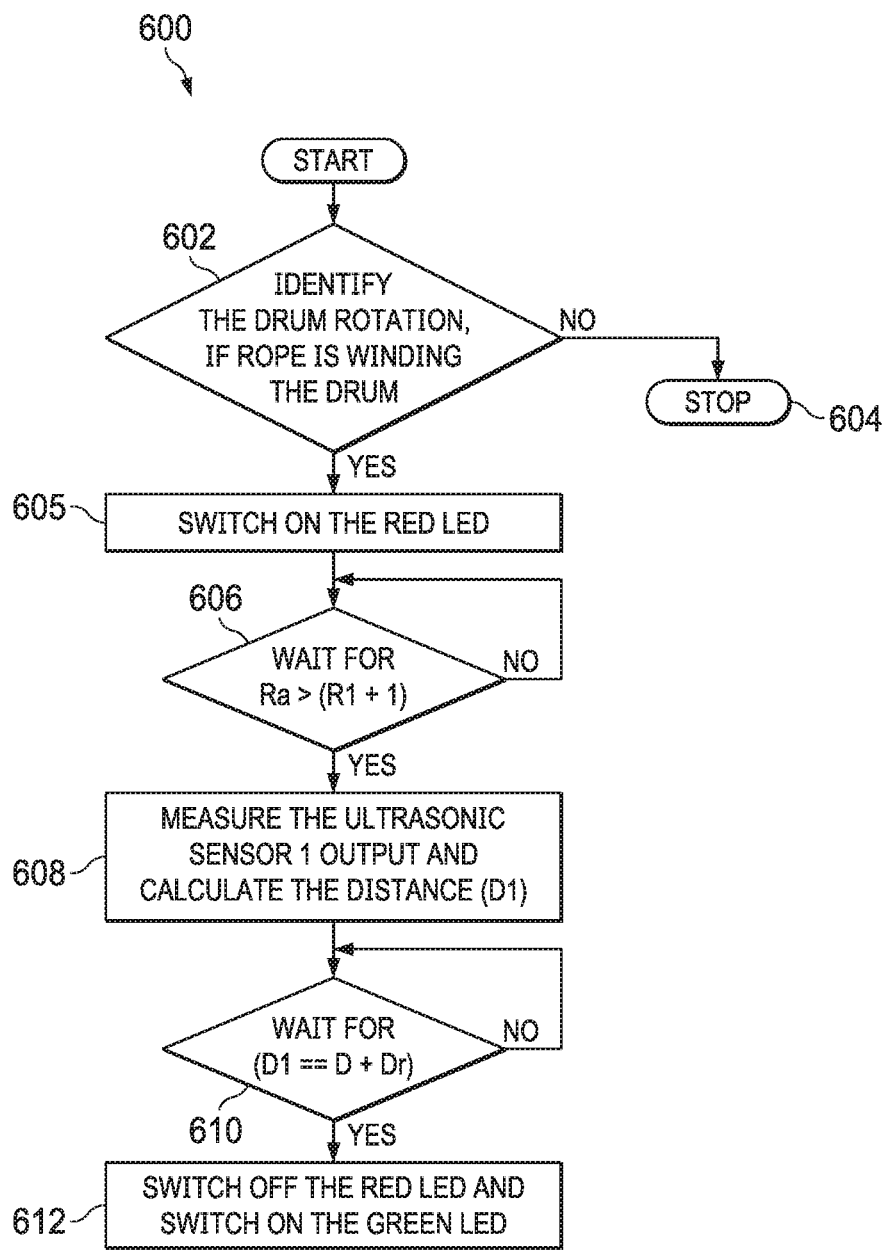
FIG. 6 is a flow diagram of a method of detecting minimum rope wraps before using a winch utilizing a system according to the present disclosure.

Referring now to FIG. 6, a flow chart 600 corresponding to further potential firmware or programming logic to be executed, for example, by the microprocessor 402 is shown. The flow chart 600 corresponds to an operation to be performed during rope winding to detect and/or report minimum rope wrap. It should be understood that the operations depicted in flow charts 500 and 600 may occur simultaneously.

At step 602 a determination may be made (e.g., based on the Hall-effect sensor 120) whether drum or spool rotation is occurring. If not, the routine may stop at step 604. A wait cycle or routine could also be implemented here. At step 605 a red LED (or amber 424 as shown in FIG. 4) is illuminated to indicate the minimum number of wraps has not occurred. At step 606 the routine waits until actual rotations are greater than the computed value for R1 plus 1. When this occurs, output or distance reported by ultrasonic sensor 112 (or the first in the series of sensors) is obtained and a computation made that is reflective of a distance that would be measured when the rope depth reaches the desired minimum (e.g., 5 wraps). The routine waits until the measured distance equals the minimum distance at step 610. It should be understood that winding may continue to occur while the routine waits at step 610. Meanwhile, a routine as illustrated at FIG. 5 may monitor for rope defects even before the minimum depth is reached. At step 610 when it is determined that the minimum number of wraps has been reached, green LED 426 may be illuminated and the red LED (or LED 424) extinguished.

Figure 8:
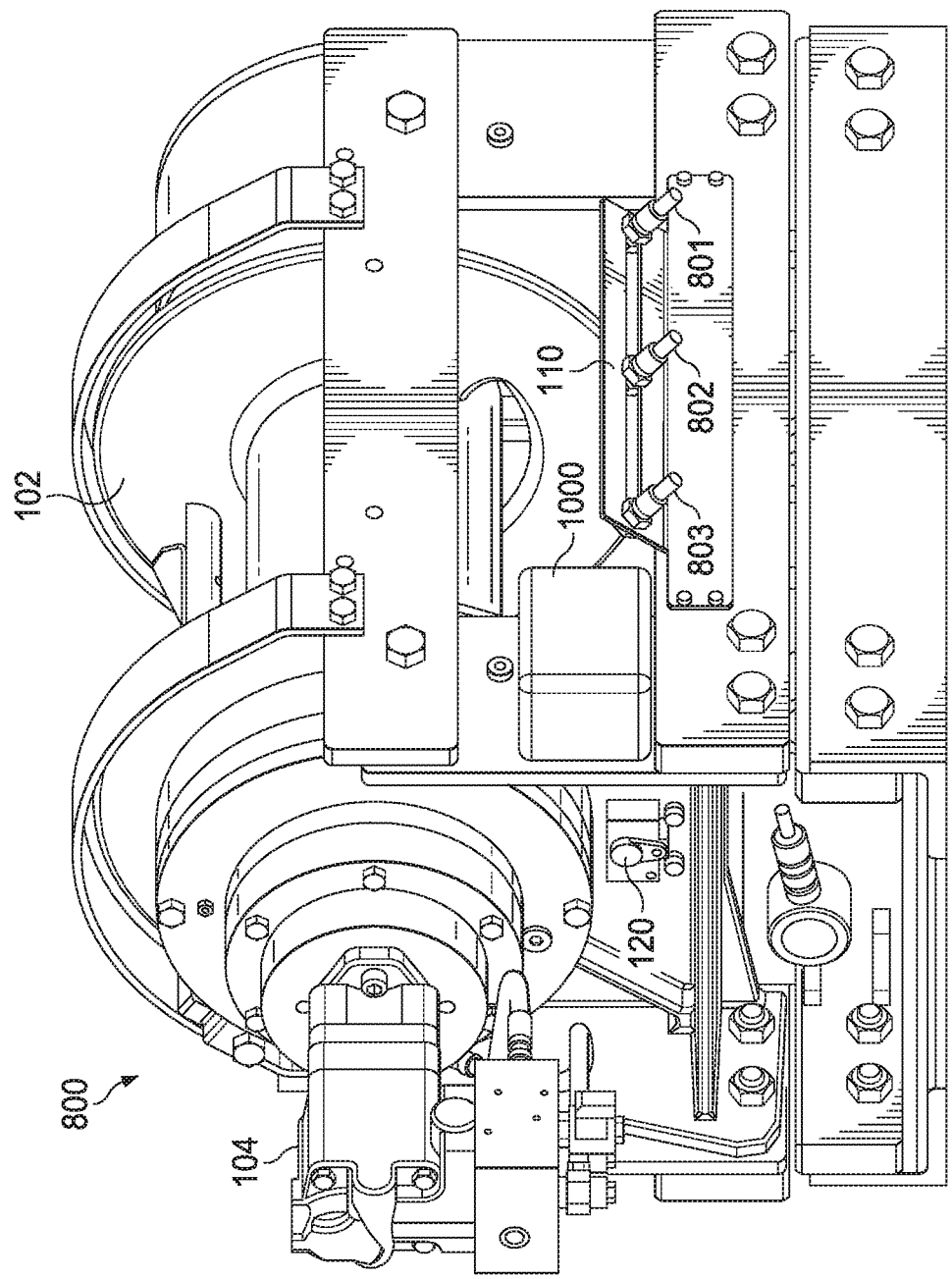
FIG. 8 is a perspective view of another embodiment of a system for rope non-uniformity detection according to aspects of the present disclosure.

Referring now to FIG. 8, a perspective view of another embodiment of a system 800 for rope non-uniformity detection according to aspects of the present disclosure is shown. The same system 800 is shown in frontal view in FIG. 11. The system 800 shares some components with the system 100 of FIG. 1. For example, a spool or drum 102 may be rotated by a motor 104 to wind and unwind rope or cable. Here though, three ultrasonic sensors 801, 802, 803 are used in somewhat different manner, but to similar purpose. Once again, more or fewer sensors may be used in some embodiments.

Figure 9:
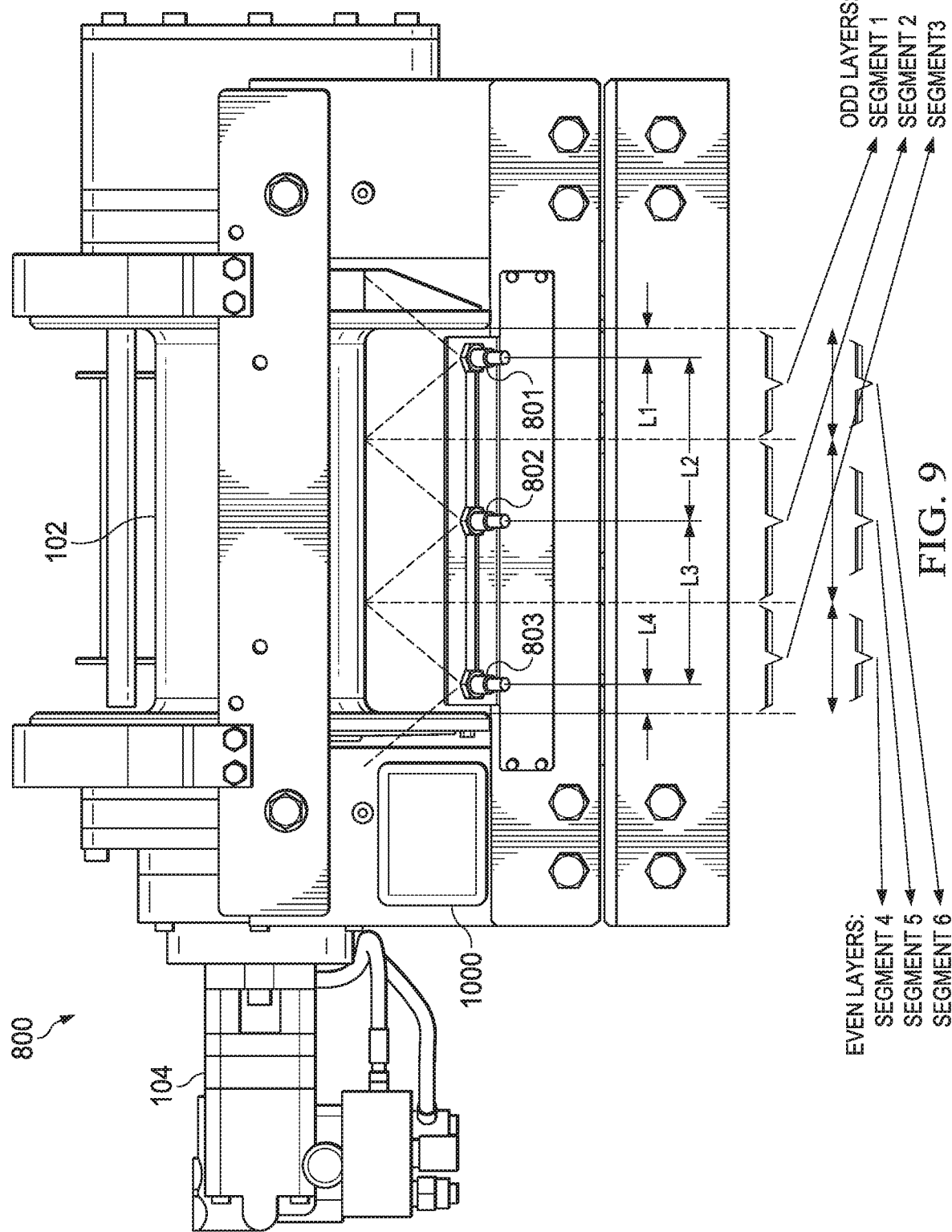
FIG. 9 is a front view of the system of FIG. 8 illustrating sensor segments.

With reference now also to FIG. 9, a front view of the system 800 is shown. Here sensors 801, 802, 803 are shows with respect to the spool 102 as well as a division of the length (axially) of the spool 102 into segments lengths L1, L2, L3, and L4. L1 may be defined as the distance or length from the right end of the spool 102 to the lateral location (along the axis of the spool 102) of sensor 801. L2 may be defined as the distance from sensor 801 to sensor 802; L3 may be defined as the distance from sensor 803 to sensor 803; and L4 may be defined as the distance from sensor 803 to the left most rope winding portion of the spool 102.

When winding rope onto the spool 102, various segments of the wind may be defined based on L1-L4. For example, as shown the segments correspond, in the case of odd rope layers on the spool 102 to segments 1-3 and, in the case of even rope layers, to segments 4-6. Segment 1 may correspond to L1 and the right half of L2; segment 2 may correspond to the right half of L2 and the left half of L3; and segment 3 may correspond to the left half of L3 plus L4. With respect to even layers, the segments may be defined reversing from left to right as: segment 4, L4 plus the left half of L3; segment 5, the right half of L3 plus the left half of L2; and segment 6, the right half of L2 plus L1. FIG. 9 also illustrates the approximate area on the spool "seen" by each sensor 801, 802, 803. L2 and L3 can be seen to be divided by the respective sensor range. Segments 1 and 6 can also be seen to correspond to the area or length of the spool 102 measured by sensor 801; segments 2 and 5 can be seen to correspond to the area or length of the spool 102 measured by sensor 802; and segments 3 and 4 can be seen to correspond to the area or length of the spool 102 measure by sensor 803. These defined lengths and segments may be utilized for tracking and calculation purposes to determine whether a rope defect has occurred, and to determine when minimum rope wraps have occurred.

Figure 10:
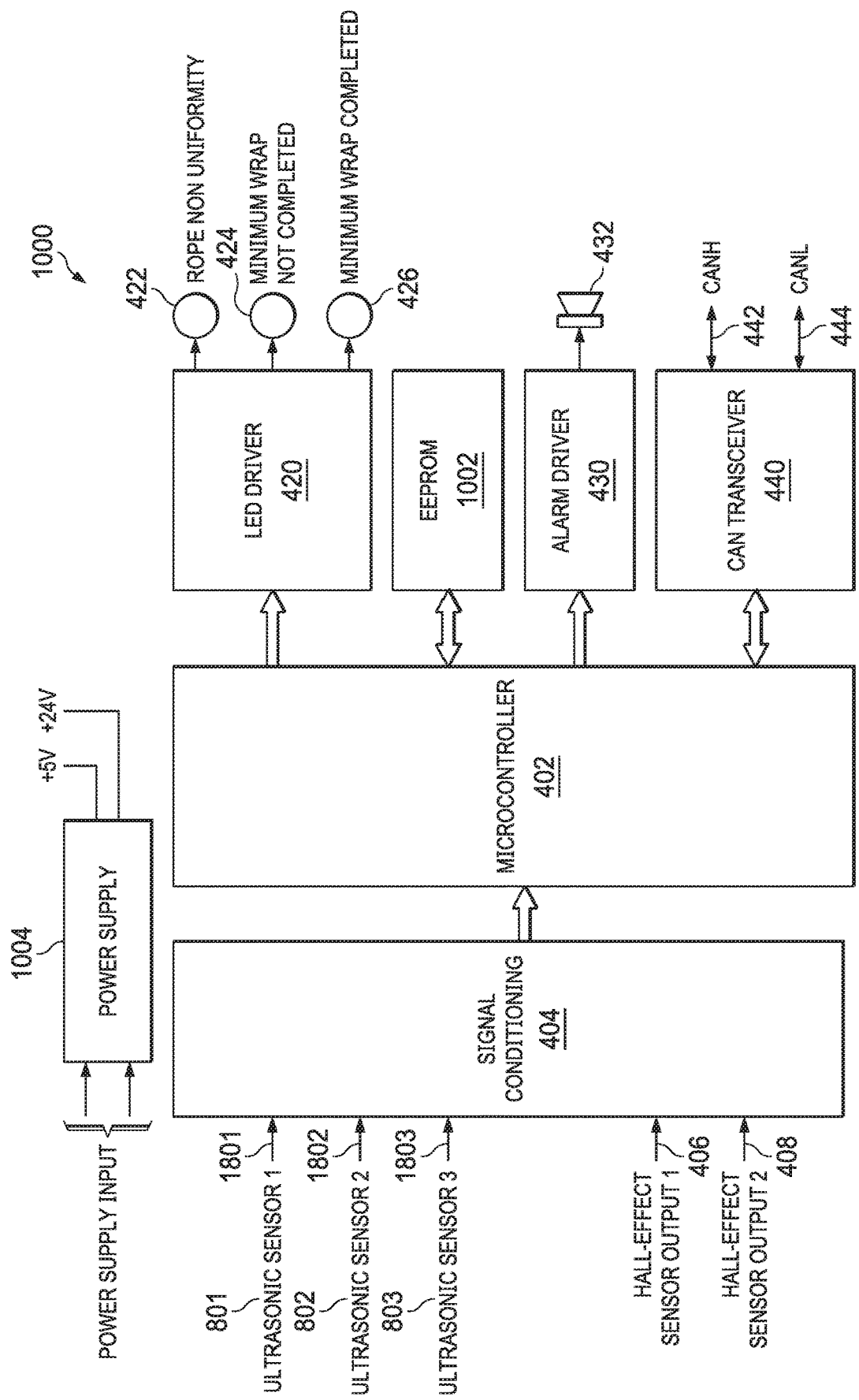
FIG. 10 is another high-level electronic block diagram of a system for rope non-uniformity detection according to aspects of the present disclosure.

Referring now to FIG. 10, another high-level electronic block diagram 1000 of a system for rope non-uniformity detection according to aspects of the present disclosure is shown. This diagram may correspond to the high-level construction of the electronic controller 106 when utilized with the system as described in FIGS. 8-9. Many components remain as described with respect to FIG. 4. However, signal conditioning block 404 provides inputs 1801, 1802,

1803 for sensors 801, 802, 803 respectively. An EEPROM (electrically erasable programmable read-only memory) 1002 is also provided here for storing control programming and constant values to be used, for example, by the microcontroller 402. The power supply 1004 may provide 5 V or 24 V as needed by various components in this embodiment.

Figure 11:
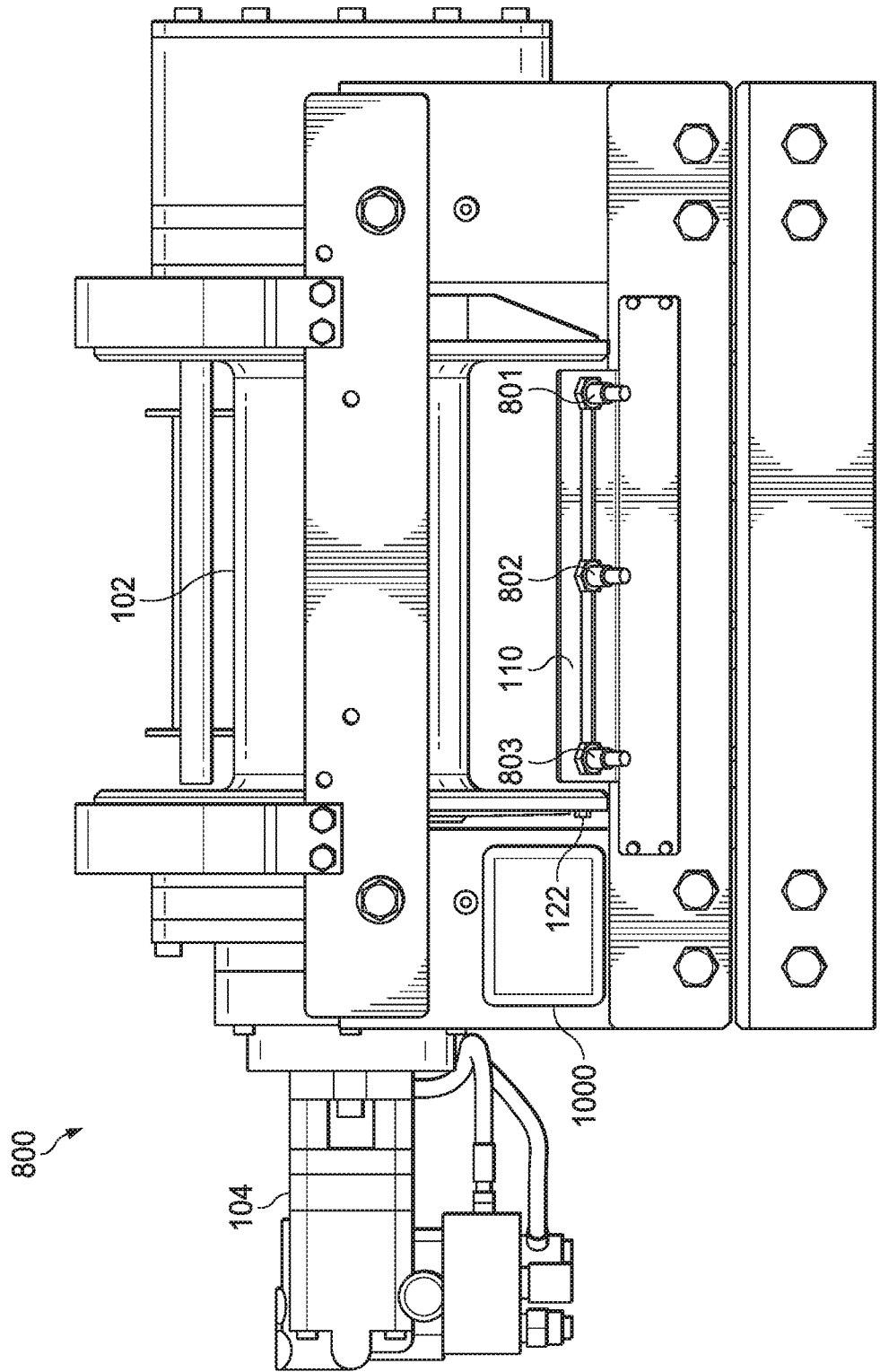
FIG. 11 is a frontal view of the system of FIG. 8.
Figure 12A:
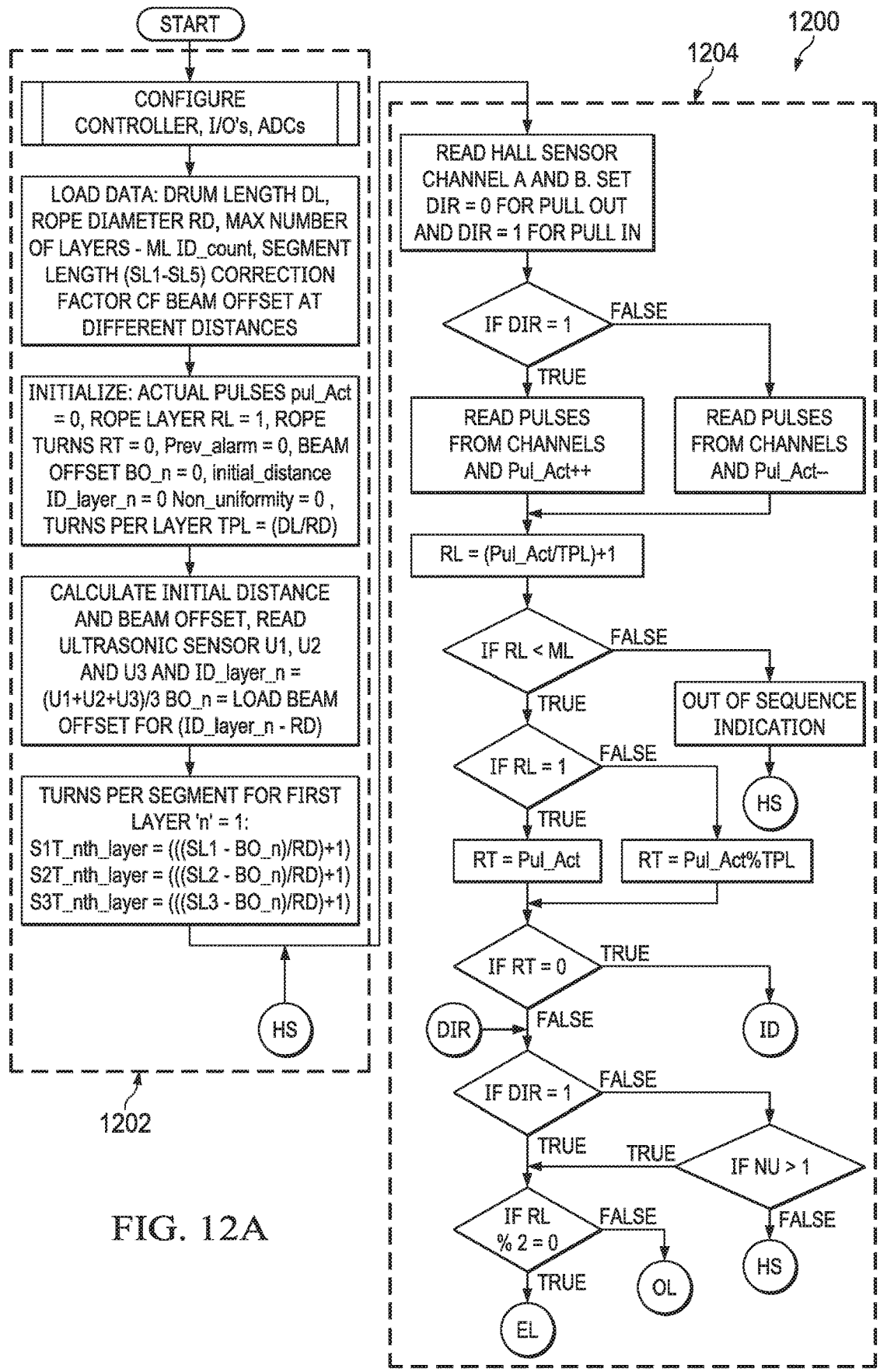
FIGS. 12A through 12E, collectively, illustrate a program flow model for determining rope-non uniformity in a segmented system.
Figure 12B:
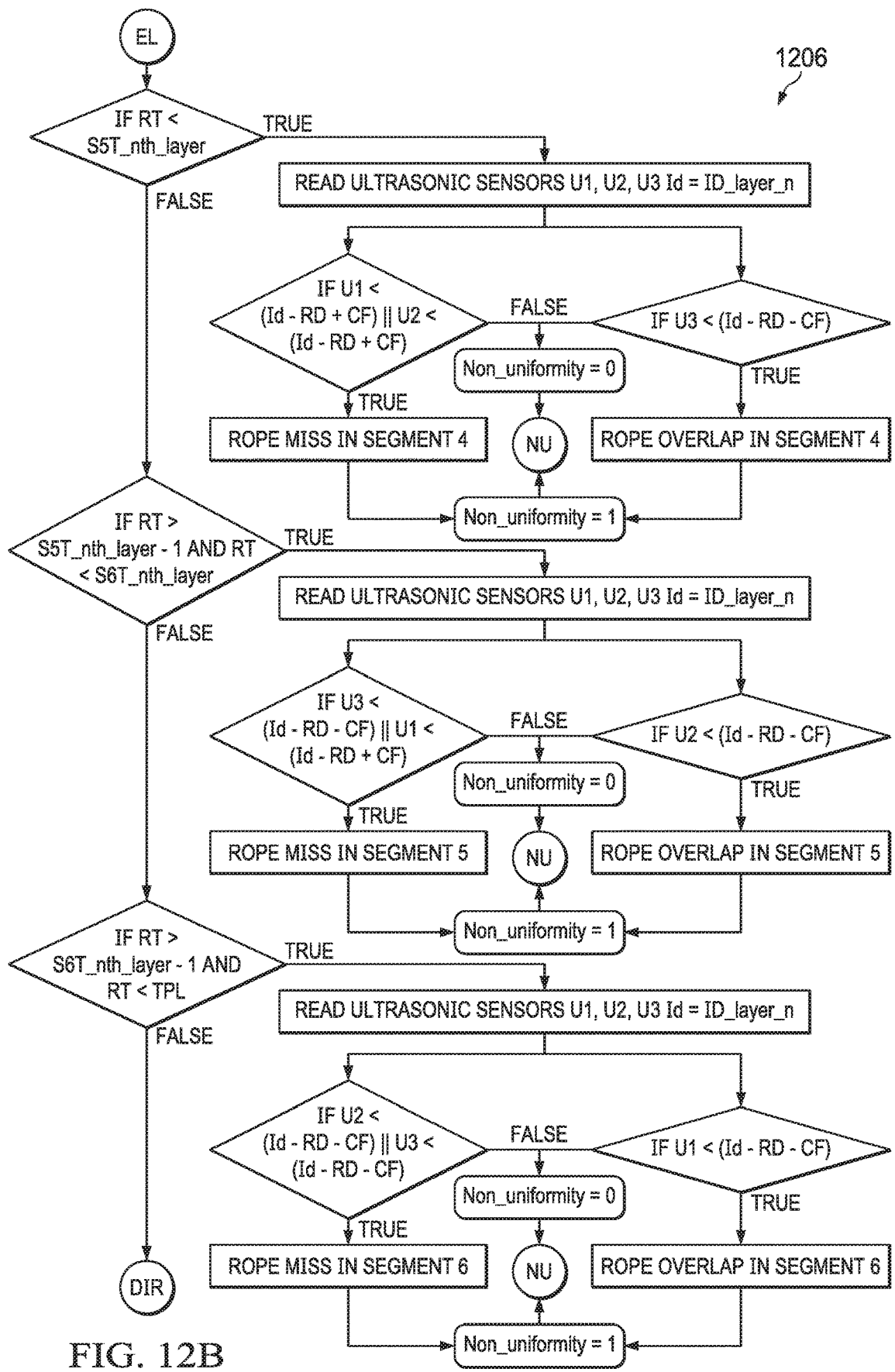
Figure 12C:
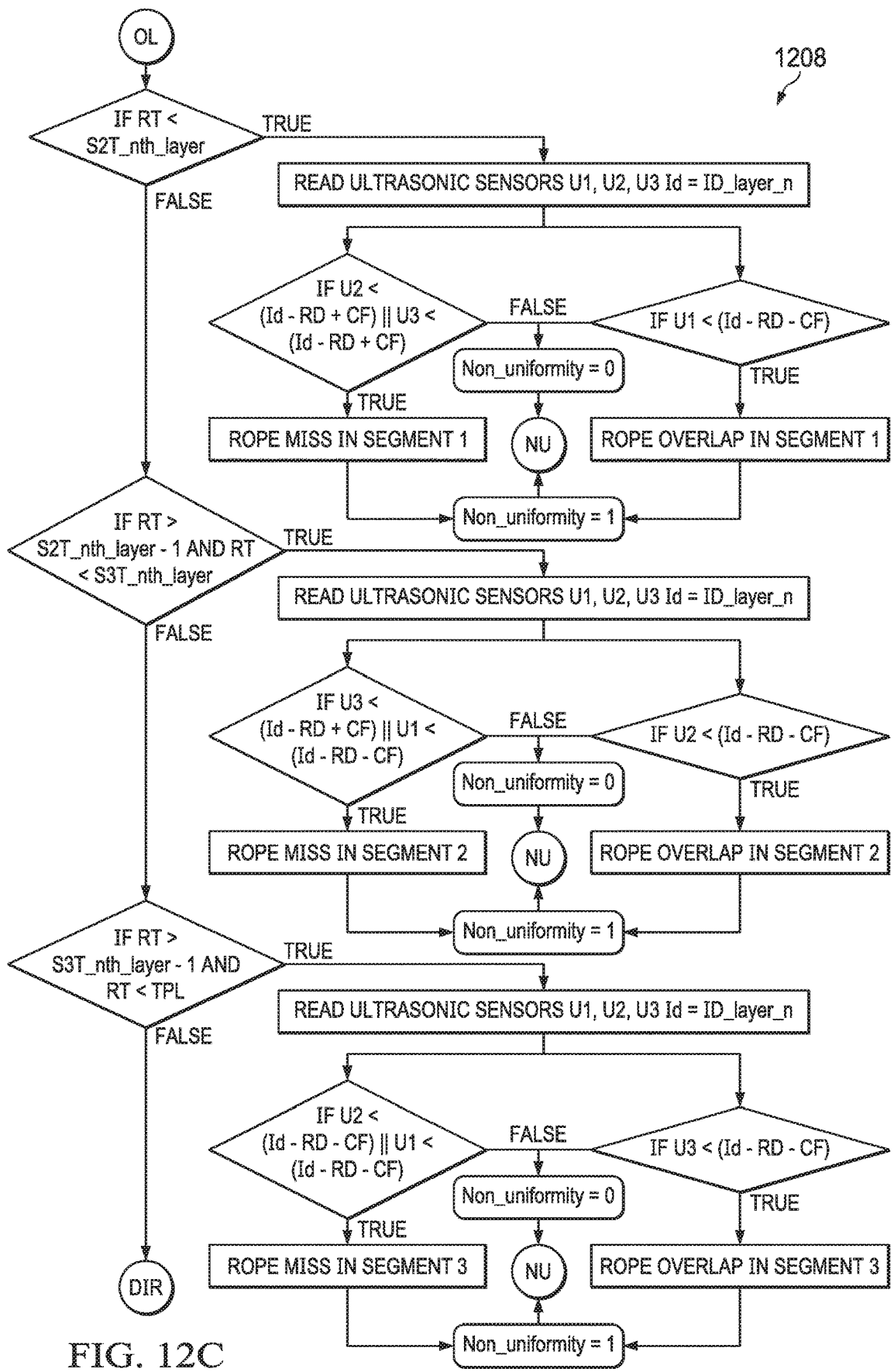
Figure 12D:
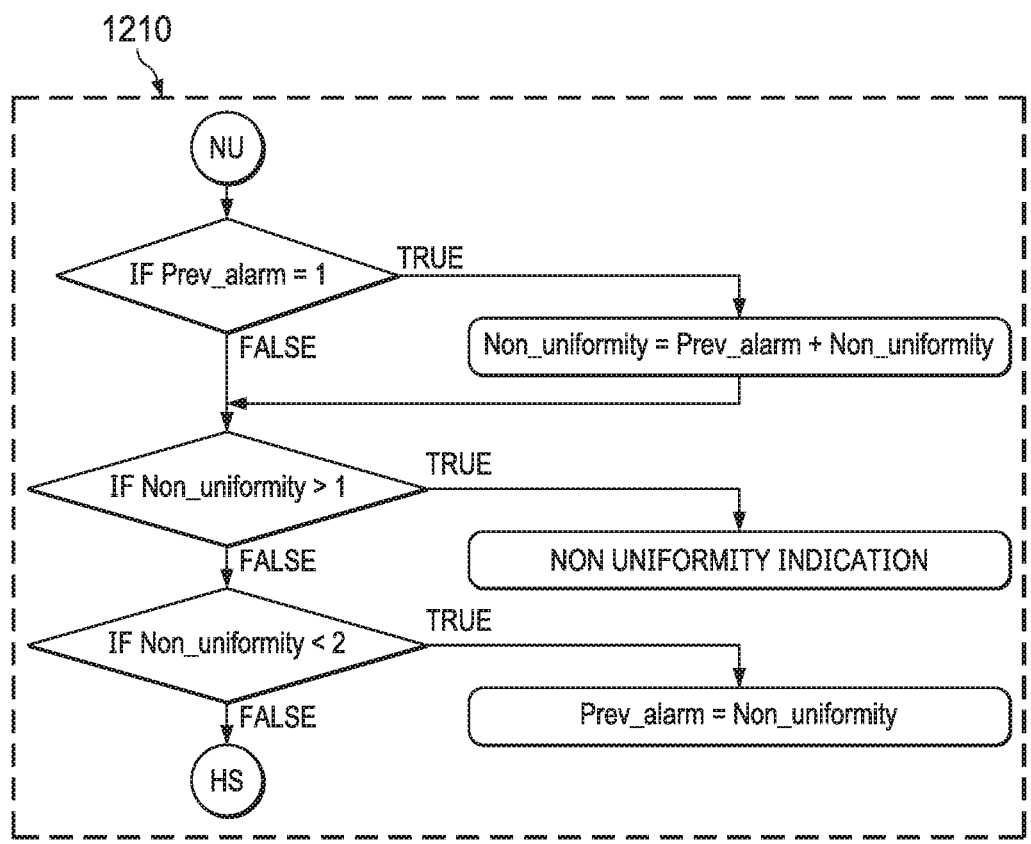
Figure 12E:
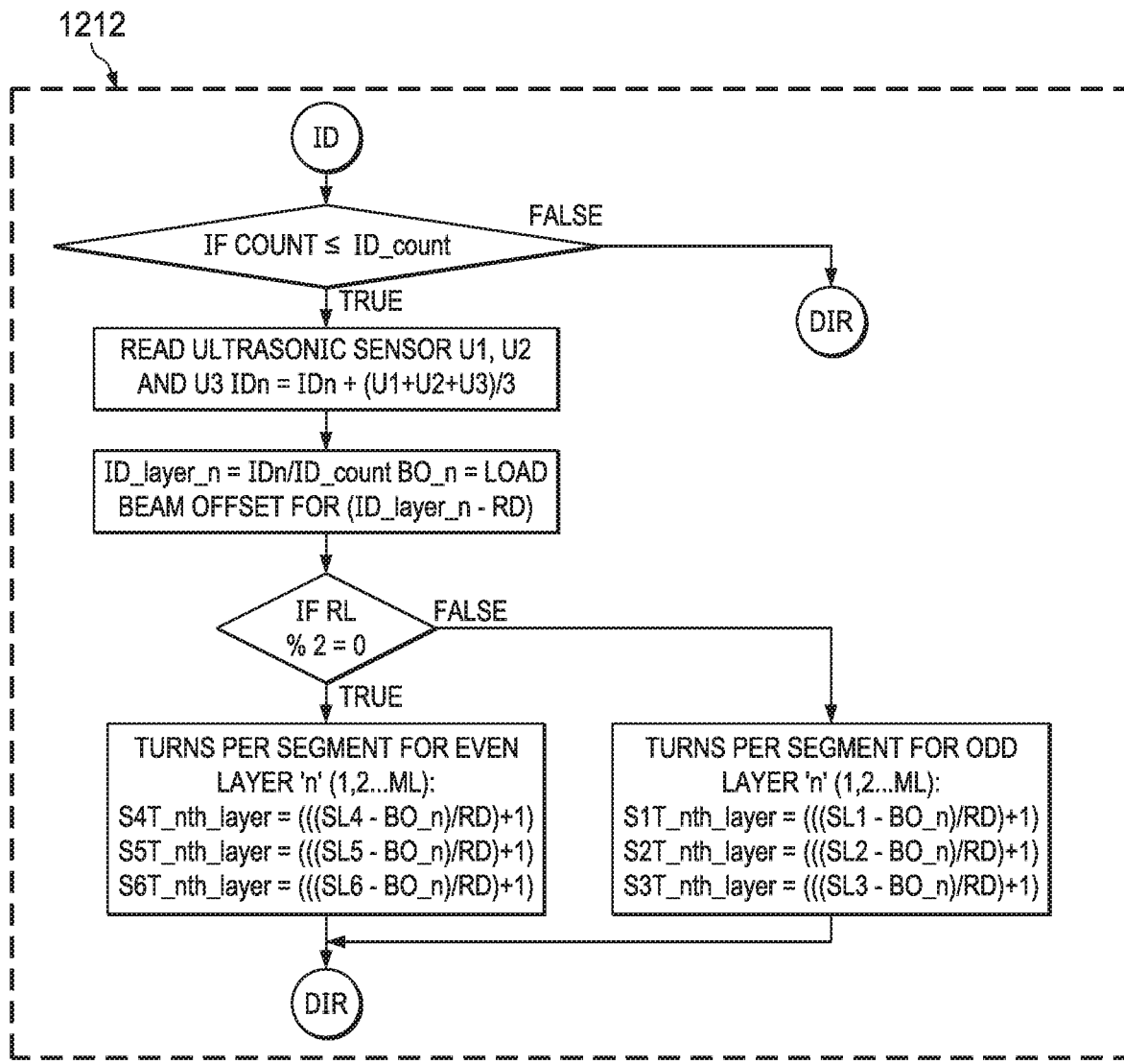

In operation the systems as shown in FIGS. 8-9, and possibly including a control unit as shown in FIGS. 10-11 may provide warning of rope defects or non-uniformity, as well as insufficient wrapping. The electronic unit 106 receives the Rope diameter (Dr) as user configuration information through standard communication protocol like UART or CAN. As described, total drum length may be divided into segments. System variables like drum length (L), segment length (SL), Ultra-Sonic Sensor Beam Offset (Bo) and others may be pre-loaded in firmware logic. In some embodiments, all system variables will be stored in EEPROM 1002 when a Power OFF sequence is detected and will be retrieved by firmware logic once the power is available again.

In one embodiment according to the system 800, the number of revolutions needed per layer or rope on the spool 102 is calculated as follows: Rc=L/Dr. Initial distance (Id) between respective ultrasonic sensor & spool 102 (drum) for each layer may be calculated as follows: Id=(U1+U2+U3)/3, where U1, U2 & U3 are the distances between respective sensor and rope layer. Beam offset (Bo) of an ultrasonic sensor 801, 802, 803 may vary based on initial distance between sensor and rope layer. An ideal number of rope turns in each segment for each layer may be calculated as: Ideal Turn for Segment 'N'=(SL−Bo)/Dr.

The system 800 also relies on the Hall-effect sensor 120. However, here there are two targets or teeth 122. Thus rotation may be detected when only half complete. It should be understood that the system 800 (or system 100) may be adapted to operate on any number of teeth or targets 122 by adjusting the counts needed from the Hall-effect sensor 120 to register a complete revolution of the drum or spool 102. Here again the direction of rotation of the drum or spool 102 may be identified using phase shift between two outputs of Hall-effect sensor 120. The revolution count values are adjusted based on direction of the drum or spool 102.

Depending on the present number of rope turns (Rt) on a respective layer, the current rope segment (1-6) can be identified. Current system variables like actual drum revolution (Ra), present rope turn (Rt), direction of rotation (Dir), present rope layer (Rl), initial distance for each layer, rope segment, ideal segment turns for each layer etc., may be written to EEPROM 1002 once Power OFF sequence is detected. Once power is available again, last stored system variables such as Ra, Rt, Rl, Dir etc. will be retrieved from EEPROM 1002 to determine the current location of the rope. Thus, the system 800 may resume operation even after power loss. It should be understood that the system 100 could be adapted to store variables to resume operation in a similar manner.

Segments may be identified in an odd layer as follows: If Rt<Ideal Turn of Segment 2, current segment is Segment 1;

If Rt>Ideal Turn of Segment 2 & Rt<Ideal Turn of Segment 3, current segment is Segment 2; and if Rt>Ideal Turn of Segment 3, current segment is Segment 3. The same logic may be applied for an even layer. Each sensor 801, 802, 803 may be polled or measured as needed to report the depth.

For all embodiments of the present disclosure, a rope non-uniformity may comprise a rope miss (e.g., the rope has not lined up so as to completely cover the layer or spool 102) or rope overlap (e.g., the rope has overlapped before a layer is complete, or before reaching the end of the spool 102). With respect to the system 800, where the layer is divided into three segments, for any segment if distance is reduced by a rope diameter prior to ideal turns of that segment then there is a rope miss non-uniformity present. If distance is not reduced by a rope diameter after the ideal turn of that segment, rope overlap non-uniformity is present.

Referring now to FIGS. 12A through 12E, collectively, a program flow model 1200 for determining rope-non uniformity in a segmented system is shown. A segmented system would be a system such as that described above where the spool is divided not only into lengths but segments. Here, the system 800 provides 6 segments as described. It should be pointed out that, in diagram 1200 sensors U1, U2, and U3 may be taken to correspond to sensors 801, 802, 803, respectively, as shown in FIG. 8. On power up or startup, program flow may begin by a variable initialization phase 1202. As shown, various known parameters may be loaded and calculated such as drum length, rope diameter, etc. as shown.

Following the initialization phase, the Hall-effect sensor 102 may be monitored as reflected in the Hall-effect sensor phase 1204 of the program 1200. Here it may be determined whether the spool 102 or drum, is taking in or letting out rope (e.g., which direction it is turning). Changes in direction or complete rotations may be accounted for as indicated. As described, the Hall-effect sensor provides two output channels to enable easy determination as to spool or drum direction.

The program flow 1200 may continuously monitor Hall-effect sensor 102 as well as the ultrasonic sensors 801, 802, 803. As described, various segments (1-6) of winding are associated with even or odd rope layers. Even layer monitoring phase 1206 as well as odd layer monitoring phase 1208 are shown in program flow 1200. It can also be seen that from either of these phases, program flow may shift to non-uniformity phase 1210 when non-uniformities are detected. As shown in non-uniformity phase 1210 appropriate alarms and indications may be activated from this phase.

Where no non-uniformity is detected by either of even layer monitoring phase 1206 or odd layer monitoring phase 1208 recorded turns per segment may be updated at turn update phase 1212.

It should be appreciated that the flow diagram 1200 represents one way of implementing an embodiment of a system and method for detecting non-uniformity in winch rope or cable. In pseudocode, such programming may be stated as:

```
Miss detection logic: ultra_n_dist < initial_distance − rope_dia +CF
Overlap detection logic: ultra_n_dist < initial_distance − rope_dia −CF
Odd layer:
if ( turns < seg2_ideal_turns ) ---> S1
     Miss detection: if ( ( ultra2_dist < initial_distance − rope_dia +CF ) || (ultra3_dist
< initial_distance − rope_dia +CF))
        overlap detection: if ( ultra1_dist < initial_distance − rope_dia −CF )
if( ( turns>seg2_ideal_turns−1) & ( turns<seg3_ideal_turns ) ) --->S2
```

```
       Miss detection: if ( ( ultra3_dist < initial_distance -rope_dia + CF ) || ( ultra1_dist
< initial_distance - rope_dia -CF)
       overlap detection: if ( ultra2_dist <initial_distance -rope_dia - CF)
if( (turns > seg3_ideal_turns-1) & (turns < turns_per_layer +1) --->S3
       Miss detection: if( (ultra1_dist < initial_distance - rope_dia - CF) || (ultra2 _dist <
initial_distance - rope_dia -CF) )
       overlap detection: if ( ultra3_dist < initial_distance - rope_dia -CF )
Even layer:
if ( turns < seg5_ideal_turns ) ---> S4
       Miss detection: if ( ( ultra2_dist < initial_distance - rope_dia +CF ) || (ultra1_dist
< initial_distance - rope_dia +CF))
       overlap detection: if ( ultra3_dist < initial_distance - rope_dia -CF )
if( ( turns>seg5_ideal_turns-1) & ( turns< seg6_ideal_turns ) ) --->S5
       Miss detection: if ( ( ultra1_dist < initial_distance -rope_dia + CF ) || ( ultra3_dist
< initial_distance - rope_dia -CF)
       overlap detection: if ( ultra2_dist <initial_distance -rope_dia - CF)
if( (turns > seg6_ideal_turns-1) & (turns < turns_per_layer +1) --->S6
       Miss detection: if( (ultra3_dist < initial_distance - rope_dia - CF) || (ultra2_dist <
initial_distance - rope_dia -CF) )
       overlap detection: if ( ultra1_dist < initial_distance - rope_dia -CF )
``` where ultra1_dist, ultra2_dist, ultra3_dist are measurements of ultrasonic sensors 801, 802, 803, respectively, and CF represent a correction factor such as the allowable variance discussed above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for monitoring for rope defects on a winch drum comprising:
   a plurality of rope depth sensors configured to measure rope depth in a plurality of locations along an axis of the winch drum;
   a rotation sensor configured to measure at least complete rotations of the winch drum; and
   a control unit communicatively coupled to the rope depth sensors and the rotation sensor;
   wherein the control unit provides an indication of rope non-uniformity when the winch drum has turned in a winding direction a sufficient number of turns for the rope to pass along the axis of the winch drum from one of the plurality of locations measured by one of the plurality of rope depth sensors to another one of the plurality of locations measured by another one of the plurality of rope depth sensors and the depth of rope on the winch drum is reported to be substantially unequal by the respective rope depth sensors.

2. The system of claim 1, wherein the control unit provides an indication of rope non-uniformity when the respective depth sensors report substantially equal depth of rope on the winch drum and the winch drum has not turned in the winding direction a sufficient number of turns for the rope to pass along the axis of the winch drum between the respective rope depth sensors.

3. The system of claim 1, wherein the control unit provides an indication of insufficient wrap when at least one of the plurality of rope depth sensors indicates a rope depth less than a predetermined number of layers multiplied by a rope diameter.

4. The system of claim 1, wherein the plurality of rope depth sensors comprises a plurality of sonic sensors.

5. The system of claim 1, wherein the rotation sensor comprises a Hall-effect sensor.

6. The system of claim 5, wherein the Hall-effect sensor comprises a dual channel Hall-effect sensor with a quadrature output and the control unit utilizes the quadrature output to determine whether the winch drum is turning in the winding direction.

7. The system of claim 6, wherein the control unit does not provide indication of rope non-uniformity when the winch drum is turning in a non-winding direction.

8. A system for monitoring for rope defects on a winch drum comprising:
   a plurality of rope depth sensors configured to measure rope depth in a plurality of locations along an axis of the winch drum;
   a rotation sensor configured to measure at least complete rotations of the winch drum; and
   a control unit communicatively coupled to the rope depth sensors and the rotation sensor;
   wherein the control unit provides an indication of rope non-uniformity when the winch drum has turned in a winding direction a sufficient number of turns for the rope to pass along the axis of the winch drum from one of the plurality of locations measured by one of the plurality of rope depth sensors to another one of the plurality of locations measured by another one of the plurality of rope depth sensors and the depth of rope on the winch drum is reported to be substantially unequal by the respective rope depth sensors; and
   wherein the control unit provides the indication of rope non-uniformity when the respective depth sensors report substantially equal depth of rope on the winch drum and the winch drum has not turned in the winding direction a sufficient number of turns for the rope to pass along the axis of the winch drum between the respective rope depth sensors.

9. The system of claim 8, wherein the plurality of sensors are configured to measure rope depth along a plurality of segments along the axis of the winch drum.

10. The system of claim 9, wherein the rotation sensor comprises a dual channel Hall-effect sensor with a quadrature output and the control unit utilizes the quadrature output to determine whether the winch drum is turning in the winding direction.

11. The system of claim 10, wherein the indication of rope non-uniformity is not given when the drum rotates in an unwinding direction.

12. The system of claim 11, wherein the indication of rope non-uniformity comprises at least one of: a warning light; an audible alarm; and an output to an electronic communications bus.

13. The system of claim 11, wherein the control unit provides an indication of insufficient wrap when at least one of the plurality of rope depth sensors indicates a rope depth less than a predetermined number of layers multiplied by a rope diameter.

14. The system of claim 13, wherein the indication of insufficient wrap comprises at least one of: a warning light; an audible alarm; and an output to an electronic communications bus.

15. The system of claim 8, wherein the plurality of rope depth sensors are arranged substantially equidistant from an axis of rotation of the winch drum along a mounting bracket spaced apart from the winch drum and parallel thereto.

16. The system of claim 15, wherein the plurality of rope depth sensors comprise a plurality of sonic sensors.

17. A system for monitoring for rope defects on a winch drum comprising:
   first and second sonic sensors spaced apart from one another and from a rotational axis of the winch drum, the first and second sonic sensors being substantially the same distance from the rotational axis of the winch drum and each configured to measure a distance to the winch drum or rope layer on the winch drum at first and second respective locations along the rotational axis of the winch drum;
   a Hall-effect sensor configured to measure at least complete rotations of the winch drum in a winding direction about its axis; and
   a control unit communicatively coupled to the sonic sensors and the Hall-effect sensor;
   wherein the control unit provides a first indication of rope non-uniformity when the winch drum has turned in the winding direction a sufficient number of turns for a rope being wound onto the winch drum to pass from the first location to the second location but the first and second sensors do not report substantially the same distance; and
   wherein the control unit provides a second indication of rope non-uniformity when the first and second sensors report substantially the same distance when the winch drum has not turned in the winding direction a sufficient number of turns for the rope being wound onto the winch drum to pass from the first location to the second location but the first and second sensors do not report substantially the same distance.

18. The system of claim 17, wherein the control unit provides an indication of insufficient rope wrap when the first and second sensors do not both report a distance less than the radius of the drum from its rotation axis plus a rope diameter multiplied by a predetermined number of required wraps.

19. The system of claim 17, wherein the first and second indications of rope non-uniformity are the same indicator.

20. The system of claim 19, wherein neither the first nor second indication of rope non-uniformity are given if the Hall-effect sensor, via quadrature output to the controller, indicates the winch drum is rotating in an unwinding direction.

* * * * *